United States Patent
Dwivedi et al.

(10) Patent No.: US 11,949,621 B2
(45) Date of Patent: Apr. 2, 2024

(54) SYSTEM AND METHOD FOR PHASE NOISE-BASED SIGNAL DESIGN FOR POSITIONING IN A COMMUNICATION SYSTEM

(71) Applicant: Telefonaktiebolaget LM Ericsson (publ), Stockholm (SE)

(72) Inventors: Satyam Dwivedi, Solna (SE); Ali Zaidi, Norrköping (SE); Dehan Luan, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 303 days.

(21) Appl. No.: 17/291,527

(22) PCT Filed: Nov. 7, 2019

(86) PCT No.: PCT/SE2019/051126
§ 371 (c)(1),
(2) Date: May 5, 2021

(87) PCT Pub. No.: WO2020/096516
PCT Pub. Date: May 14, 2020

(65) Prior Publication Data
US 2022/0006589 A1  Jan. 6, 2022

Related U.S. Application Data

(60) Provisional application No. 62/758,222, filed on Nov. 9, 2018.

(51) Int. Cl.
| | |
|---|---|
| *H04L 5/00* | (2006.01) |
| *G01S 5/02* | (2010.01) |
| *G01S 5/10* | (2006.01) |
| *H04L 27/26* | (2006.01) |

(52) U.S. Cl.
CPC .......... *H04L 5/0051* (2013.01); *G01S 5/0226* (2013.01); *G01S 5/10* (2013.01); *H04L 27/261* (2013.01)

(58) Field of Classification Search
CPC ... H04L 5/0051; H04L 27/261; G01S 5/0226; G01S 5/01
See application file for complete search history.

(56) References Cited

U.S. PATENT DOCUMENTS

| | | | |
|---|---|---|---|
| 10,098,088 B1 | 10/2018 | Kumar et al. | |
| 10,469,226 B2 * | 11/2019 | Kim | ...... H04L 5/0048 |

(Continued)

FOREIGN PATENT DOCUMENTS

| | | | | |
|---|---|---|---|---|
| WO | 2018113760 A1 | 6/2018 | | |
| WO | WO-2018171805 A1 * | 9/2018 | ........... | H04L 5/0005 |
| WO | 2019135103 A1 | 11/2019 | | |

OTHER PUBLICATIONS

International Search Report and Written Opinion dated Feb. 7, 2020 for International Application No. PCT/SE2019/051126 filed Nov. 7, 2019, consisting of 14-pages.

(Continued)

*Primary Examiner* — Khai M Nguyen
(74) *Attorney, Agent, or Firm* — Christopher & Weisberg, P.A.

(57) ABSTRACT

A system and method for providing phase noise-based signal design for positioning in a communication system. In one embodiment, an apparatus is configured to receive configuration parameters for a reference signal based on a level of phase noise for the reference signal estimated by a user equipment, apply the configuration parameters to the reference signal to obtain a modified reference signal, and transmit the modified reference signal to the user equipment to enable a position of the user equipment to be determined.

8 Claims, 23 Drawing Sheets

(56) References Cited

U.S. PATENT DOCUMENTS

| | | | | |
|---|---|---|---|---|
| 10,897,746 | B2* | 1/2021 | Hwang | H04W 80/08 |
| 2017/0318554 | A1* | 11/2017 | Kim | G01S 1/20 |
| 2018/0035256 | A1* | 2/2018 | Prevatt | G01S 5/14 |
| 2018/0041321 | A1 | 2/2018 | Guo et al. | |
| 2019/0158171 | A1 | 5/2019 | Ren et al. | |
| 2019/0364570 | A1 | 11/2019 | Kumar et al. | |
| 2019/0373564 | A1* | 12/2019 | Henriksson | H04W 52/325 |

OTHER PUBLICATIONS

Ali A. Zaidi et al.; Waveform and Numerology to Support 5G Services and Requirements; IEEE Communications Magazine vol. 54, Issue 11, Nov. 2016, consisting of 9-pages.

Dehan Luan; Fundamental Performance Limits on Time of Arrival Estimation Accuracy with 5G Radio Access; Degree project in Electrical Engineering, Second Cycle, 30 Credits; KTH Royal Institute of Technology School of Electrical Engineering; Stockholm, Sweden, 2017, consisting of 49-pages.

3GPP TR 38.913 V15.0.0; 3rd Generation Partnership Project; Technical Specification Group Radio Access Network; Study on Scenarios and Requirements for Next Generation Access Technologies; (Release 15), Jun. 2018, consisting of 39-pages.

Steven M. Kay; Fundamentals of Statistical Signal Processing: Estimation Theory; Jan. 1, 1993, Prentice hall PTR, Upper Saddle, New Jersey, consisting of 303-pages.

EPO Communication with Supplementary European Search Report dated Jul. 8, 2022 for Patent Application No. 19882687.7, consisting of 6-pages.

* cited by examiner

US 11,949,621 B2

SYSTEM AND METHOD FOR PHASE NOISE-BASED SIGNAL DESIGN FOR POSITIONING IN A COMMUNICATION SYSTEM

CROSS-REFERENCE TO RELATED APPLICATIONS

This application is a Submission Under 35 U.S.C. § 371 for U.S. National Stage Patent Application of International Application No.: PCT/SE2019/051126, filed Nov. 7, 2019 entitled "SYSTEM AND METHOD FOR PHASE NOISE-BASED SIGNAL DESIGN FOR POSITIONING IN A COMMUNICATION SYSTEM," which claims priority to U. S. Provisional Application No.: 62/758222, filed Nov. 9, 2018, the entireties of both of which are incorporated herein by reference.

TECHNICAL FIELD

The present disclosure is directed, in general, to the communication systems and, more specifically, to a system and method for providing phase noise-based signal design for positioning in a communication system.

BACKGROUND

Positioning reveals an increasingly important role since Third Generation Partnership Program ("3GPP") Release 9 introduced in Long Term Evolution ("LTE") standardization, is originally aimed for emergency calling and location-based services. Furthermore, in the Fifth-Generation ("5G") cellular network era, enhanced positioning performance of reaching sub-meter accuracy is suggested for 5G use cases. Especially under industrial Internet of Things ("IoT") scenarios, such as IoT basement, smart factory, shopping mall, and mining site, stringent requirements for indoor positioning or even deep indoor positioning performance may be necessary.

Phase noise caused by phase fluctuations of a local oscillator, is one of the hardware impairments, which has a considerable effect on positioning degradation, especially under a low power consumption environment such as IoT scenarios. Basically, the phase noise level increases with higher carrier frequency under a given frequency offset, which means for mid-band or high-band frequency signals in 5G use cases, phase noise results in a challenge. Accordingly, what is needed in the art is a system and method for overcoming positioning challenges in a communication system.

SUMMARY

These and other problems are generally solved or circumvented, and technical advantages are generally achieved, by advantageous embodiments of the present disclosure for a system and method for providing phase noise-based signal design for positioning in a communication system. In one embodiment, an apparatus such as a base station is configured to receive configuration parameters for a reference signal based on a level of phase noise for the reference signal estimated by a user equipment, apply the configuration parameters to the reference signal to obtain a modified reference signal, and transmit the modified reference signal to the user equipment to enable a position of the user equipment to be determined.

In a related embodiment, an apparatus such as a user equipment is configured to transmit a positioning request to a base station, estimate a level of phase noise for a reference signal, and transmit the estimate of the level of phase noise to enable the base station to apply configuration parameters to the reference signal to obtain a modified reference signal. The configuration parameters are based on the estimate of the level of phase noise. The apparatus is also configured to receive the modified reference signal from the base station to enable a position of the apparatus to be determined.

In another embodiment, an apparatus such as a base station is configured receive configuration parameters for a reference signal based on a level of phase noise for the reference signal estimated by the apparatus, and transmit the configuration parameters to the user equipment to enable the user equipment to apply the configuration parameters to the reference signal to obtain a modified reference signal. The apparatus is also configured to receive the modified reference signal from the user equipment to enable a position of the user equipment to be determined.

In a related embodiment, an apparatus such as a user equipment is configured to transmit a positioning request to a base station, receive configuration parameters for a reference signal based on a level of phase noise for the reference signal estimated by the base station, and apply the configuration parameters to the reference signal to obtain a modified reference signal. The apparatus is also configured to transmit the modified reference signal to the base station to enable a position of the apparatus to be determined.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

Figure 1:
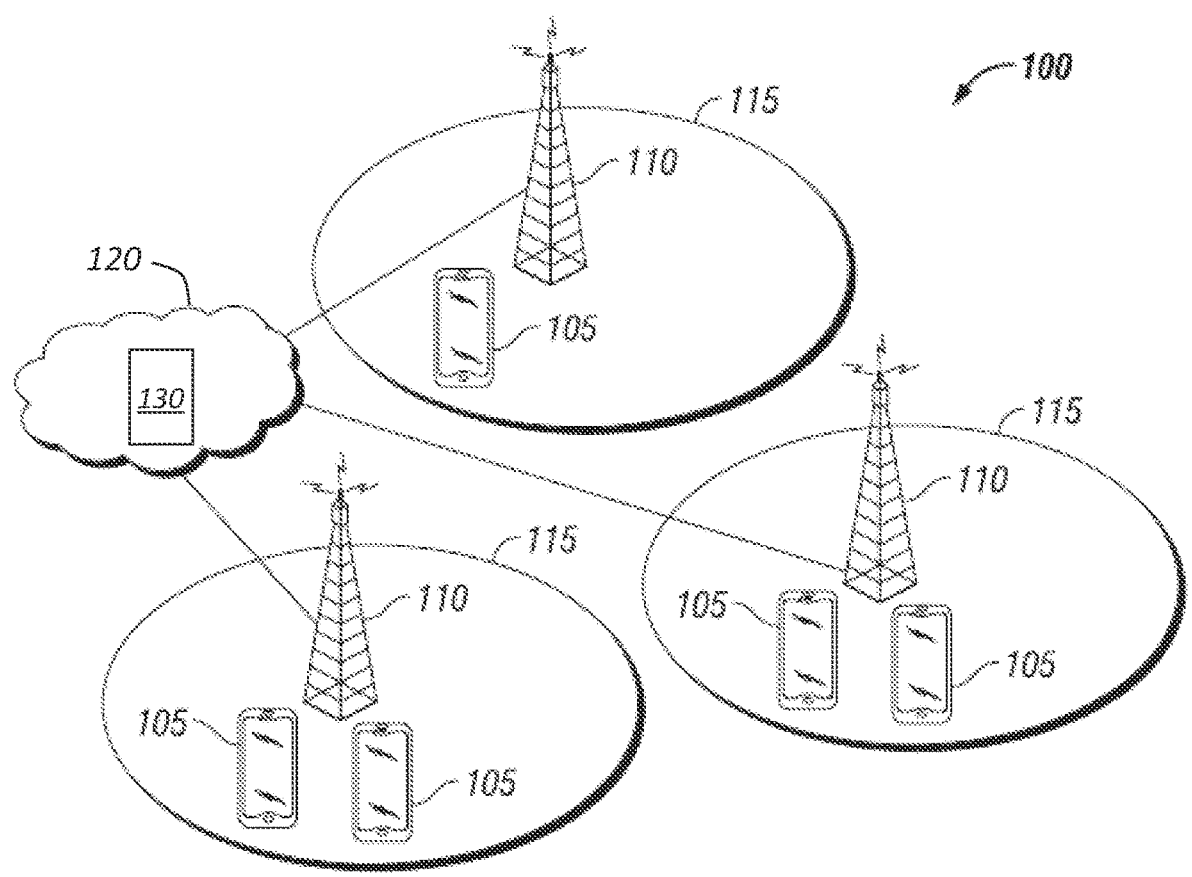
FIGS. 1 to 3 illustrate diagrams of embodiments of a communication system, and portions thereof.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules method for providing phase noise-based signal design for positioning of a user equipment or other communication node in a communication system. While the principles will be described in the environment of a Third Generation Partnership Program ("3GPP") Long Term Evolution ("LTE") and/or Fifth Generation ("5G") communication system, any environment such as a Wi-Fi wireless communication system is well within the broad scope of the present disclosure.

In some embodiments, a non-limiting term user equipment ("UE") is used. The user equipment can be any type of wireless communication device—with or without an active user-capable of communicating with a network node or another user equipment over radio signals. The user equipment may be any device that has an addressable interface (e.g., an Internet protocol ("IP") address, a Bluetooth identifier ("ID"), a near-field communication ("NFC") ID, etc.), a cell radio network temporary identifier ("C-RNTI"), and/or is intended for accessing services via an access network and configured to communicate over the access network via the addressable interface. The user equipment may include, without limitation, a radio communication device, a target device, a device to device ("D2D") user equipment, a machine type user equipment or user equipment capable of machine to machine communication ("M2M"), a sensor device, meter, vehicle, household appliance, medical appliance, media player, camera, a personal computer ("PC"), a tablet, a mobile terminal, a smart phone, a laptop embedded equipment ("LEE"), a laptop mounted equipment ("LME"), a universal serial bus ("USB") dongle, and customer premises equipment ("CPE").

Also, in some embodiments, generic terminology "network node" is used. It can be any kind of network node that may include a radio network node such as base station, radio base station, base transceiver station, base station controller, network controller, multi-standard radio base station, g Node B ("gNB"), new radio ("NR") base station, evolved Node B ("eNB"), Node B, multi-cell/multicast coordination entity ("MCE"), relay node, access point, radio access point, remote radio unit ("RRU") remote radio head ("RRH"), a multi-standard radio base station ("MSR BS"), a core network node (e.g., mobility management entity ("MME"), self-organizing network ("SON") node, a coordinating node, positioning node, minimization of drive test ("MDT") node, etc.), or even an external node (e.g., third party node, a node external to the current network), etc. The network node may also include test equipment. The term "radio node" used herein may be used to denote a user equipment or a radio network node. These various nodes will be introduced herein below.

The term "signaling" used herein may include, without limitation, high-layer signaling (e.g., via radio resource control ("RRC") or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio signal measurement" used herein may refer to any measurement performed on radio signals. The radio signal measurements can be absolute or relative. The radio signal measurement may be called as signal level that may be signal quality and/or signal strength. The radio signal measurements can be, for instance, intra-frequency, inter-frequency, inter-radio access technology ("RAT") measurements, carrier aggregation ("CA") measurements. The radio signal measurements can be unidirectional (e.g., downlink ("DL") or uplink ("UL")) or bidirectional (e.g., round trip time ("RTT"), Rx-Tx, etc.). Some examples of radio signal measurements include timing measurements (e.g., time of arrival ("TOA"), timing advance, round trip time ("RTT"), reference signal time difference ("RSTD"), Rx-Tx, propagation delay, etc.), angle measurements (e.g., angle of arrival), power-based measurements (e.g., received signal power, reference signal received power ("RSRP"), received signal quality, reference signal received quality ("RSRQ"), signal-to-interference-plus-noise ratio ("SINR"), signal-to-noise ratio ("SNR"), interference power, total interference plus noise, received signal strength indicator ("RSSI"), noise power, etc.), cell detection or cell identification, radio link monitoring ("RLM"), and system information ("SI") reading, etc. The inter-frequency and inter-RAT measurements may be carried out by the user equipment in measurement gaps unless the user equipment is capable of doing such measurement without gaps. Examples of measurement gaps are measurement gap id #0 (each gap of six milliseconds ("ms") occurring every 40 ms), measurement gap id #1 (each gap of six ms occurring every 80 ms), etc. The measurement gaps maybe configured by the network node for the user equipment.

Performing a measurement on a carrier may imply performing measurements on signals of one or more cells operating on that carrier or performing measurements on signals of the carrier (a carrier specific measurement such as RSSI). Examples of cell specific measurements are signal strength, signal quality, etc.

The term measurement performance may refer to any criteria or metric that characterizes the performance of the measurement performed by a radio node. The term measurement performance is also called as measurement requirement, measurement performance requirements, etc. The radio node meets one or more measurement performance criteria related to the performed measurement. Examples of measurement performance criteria are measurement time, number of cells to be measured with the measurement time, measurement reporting delay, measurement accuracy, measurement accuracy with respect to a reference value (e.g., ideal measurement result), etc.

Examples of measurement time are measurement period, cell identification period, evaluation period, etc.

The embodiments described herein may be applied to any multicarrier system wherein at least two radio network nodes can configure radio signal measurements for the same user equipment. One specific example scenario includes a dual connectivity deployment with LTE primary cell ("PCell") and NR primary secondary cell ("PSCell"). Another example scenario is a dual connectivity deployment with NR PCell and NR PSCell.

The term time resource used herein may correspond to any type of physical resource or radio resource expressed in terms of length of time. Examples of time resources are, without limitation, symbol, mini-slot, time slot, subframe, radio frame, transmission time interval ("TTI"), and interleaving time. The term TTI used herein may correspond to any time period over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF) and mini-subframe. The embodiments described herein may apply to any radio resource control ("RRC") state such as RRC_CONNECTED or RRC_IDLE.

Figure 2:
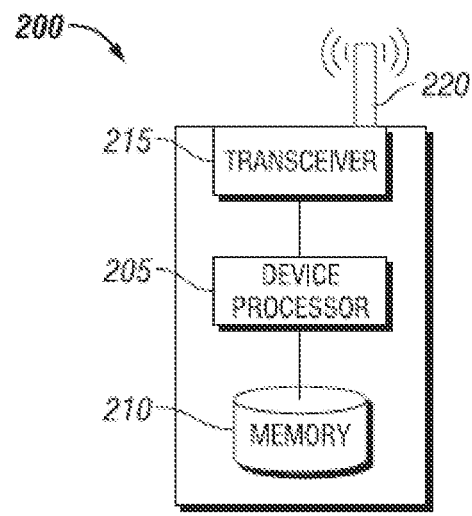
Figure 3:
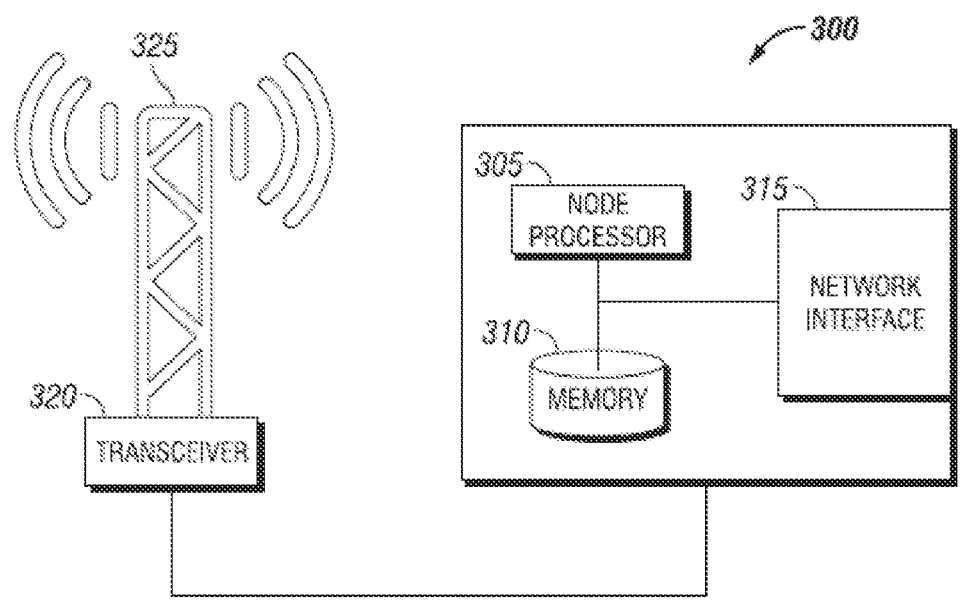

Referring initially to FIGS. 1 to 3, illustrated are diagrams of embodiments of a communication system 100, and portions thereof. As shown in FIG. 1, the communication system 100 includes one or more instances of user equipment (generally designated 105) in communication with one or more radio access nodes (generally designated 110). The communication network 100 is organized into cells 115 that are connected to a core network 120 via corresponding radio access nodes 110. In particular embodiments, the communication system 100 may be configured to operate according to specific standards or other types of predefined rules or procedures. Thus, particular embodiments of the communication system 100 may implement communication standards, such as Global System for Mobile Communications ("GSM"), Universal Mobile Telecommunications System ("UNITS"), Long Term Evolution ("LTE"), and/or other suitable 2G, 3G, 4G, or 5G standards; wireless local area network ("WLAN") standards, such as the IEEE 802.11 standards; and/or any other appropriate wireless communication standard, such as the Worldwide Interoperability for Microwave Access ("WiMax"), Bluetooth, and/or ZigBee standards.

In addition to the devices mentioned above, the user equipment 105 may be a portable, pocket-storable, handheld, computer-comprised, or vehicle-mounted mobile device, enabled to communicate voice and/or data, via a wireless or wireline connection. A user equipment 105 may have functionality for performing monitoring, controlling, measuring, recording, etc., that can be embedded in and/or controlled/monitored by a processor, central processing unit ("CPU"), microprocessor, ASIC, or the like, and configured for connection to a network such as a local ad-hoc network or the Internet. The user equipment 105 may have a passive communication interface, such as a quick response (Q) code, a radio-frequency identification ("RFID") tag, an NFC tag, or the like, or an active communication interface, such as a modem, a transceiver, a transmitter-receiver, or the like. In an Internet of Things ("IoT") scenario, the user equipment 105 may include sensors, metering devices such as power meters, industrial machinery, or home or personal appliances (e.g., refrigerators, televisions, personal wearables such as watches) capable of monitoring and/or reporting on its operational status or other functions associated with its operation.

Alternative embodiments of the user equipment 105 may include additional components beyond those shown in FIG. 1 that may be responsible for providing certain aspects of the functionality, including any of the functionality described herein and/or any functionality necessary to support the solution described herein. As just one example, the user equipment 105 may include input interfaces, devices and circuits, and output interfaces, devices and circuits. The input interfaces, devices, and circuits are configured to allow input of information into the user equipment 105, and are connected to a processor to process the input information. For example, input interfaces, devices, and circuits may include a microphone, a proximity or other sensor, keys/buttons, a touch display, one or more cameras, a universal serial bus ("USB") port, or other input elements. Output interfaces, devices, and circuits are configured to allow output of information from the user equipment 105, and are connected to the processor to output information from the user equipment 105. For example, output interfaces, devices, or circuits may include a speaker, a display, vibrating circuitry, a USB port, a headphone interface, or other output elements. Using one or more input and output interfaces, devices, and circuits, the user equipment 105 may communicate with end users and/or the wireless network, and allow them to benefit from the functionality described herein.

As another example, the user equipment 105 may include a power source. The power source may include power management circuitry. The power source may receive power from a power supply, which may either be internal or external to the power source. For example, the user equipment 105 may include a power supply in the form of a battery or battery pack that is connected to, or integrated into, the power source. Other types of power sources, such as photovoltaic devices, may also be used. As a further example, the user equipment 105 may be connectable to an external power supply (such as an electricity outlet) via an input circuitry or interface such as an electrical cable, whereby the external power supply supplies power to the power source.

The radio access nodes 110 such as base stations are capable of communicating with the user equipment 105 along with any additional elements suitable to support communication between user equipment 105 or between a user equipment 105 and another communication device (such as a landline telephone). The radio access nodes 110 may be categorized based on the amount of coverage they provide (or, stated differently, their transmit power level) and may then also be referred to as femto base stations, pico base stations, micro base stations, or macro base stations. The radio access nodes 110 may also include one or more (or all) parts of a distributed radio access node such as centralized digital units and/or remote radio units ("RRUs"), sometimes referred to as remote radio heads ("RRHs"). Such remote radio units may or may not be integrated with an antenna as an antenna integrated radio. Parts of a distributed radio base stations may also be referred to as nodes in a distributed antenna system ("DAS"). As a particular non-limiting example, a base station may be a relay node or a relay donor node controlling a relay.

The radio access nodes 110 may be composed of multiple physically separate components (e.g., a NodeB component and a radio network controller ("RNC") component, a base transceiver station ("BTS") component and a base station controller ("BSC") component, etc.), which may each have their own respective processor, memory, and interface components. In certain scenarios in which the radio access nodes 110 include multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, the radio access nodes 110 may be configured to support multiple radio access technologies ("RATs"). In such embodiments, some components may be duplicated (e.g., separate memory for the different RATs) and some components may be reused (e.g., the same antenna may be shared by the RATs).

Although the illustrated user equipment 105 may represent communication devices that include any suitable combination of hardware and/or software, the user equipment 105 may, in particular embodiments, represent devices such as the example user equipment 200 illustrated in greater detail by FIG. 2. Similarly, although the illustrated radio access node 110 may represent network nodes that include any suitable combination of hardware and/or software, these nodes may, in particular embodiments, represent devices such as the example radio access node 300 illustrated in greater detail by FIG. 3. Additionally, a location server 130 may reside in the core network 120 and include any suitable combination of hardware and/or software akin to the radio access node 110.

As shown in FIG. 2, the example user equipment 200 includes a processor (or processing circuitry) 205, a memory 210, a transceiver 215 and antennas 220. In particular embodiments, some or all of the functionality described above as being provided by machine type communication ("MTC") and machine-to-machine ("M2M") devices, and/or any other types of communication devices may be provided by the device processor 205 executing instructions stored on a computer-readable medium, such as the memory 210 shown in FIG. 2. Alternative embodiments of the user equipment 200 may include additional components (such as the interfaces, devices and circuits mentioned above) beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 305, a memory 310, a transceiver 320, a network interface 315 and antennas 325. In particular embodiments, some or all of the functionality described herein may be provided by a base station, a radio network controller, a relay station and/or any other type of network nodes (see examples above) in connection with the node processor 305 executing instructions stored on a computer-readable medium, such as the memory 310 shown in FIG. 3. Alternative embodiments of the radio access node 300 may include additional components responsible for providing additional functionality, including any of the functionality identified above and/or any functionality necessary to support the solution described herein. Additionally, the location server 120 may include ones of the components of the radio access node 300.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing, location analysis and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processors may include one or more of radio frequency ("RF") transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset.

The processors may be configured to perform any determining operations described herein. Determining as performed by the processors may include processing information obtained by the processor by, for example, converting the obtained information into other information, comparing the obtained information or converted information to information stored in the respective device, and/or performing one or more operations based on the obtained information or converted information, and as a result of the processing making a determination.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

The antennas may be any type of antenna capable of transmitting and receiving data and/or signals wirelessly. In some embodiments, the antennas may include one or more omni-directional, sector or panel antennas operable to transmit/receive radio signals between, for example, 2 gigahertz ("GHz") and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Figure 4:
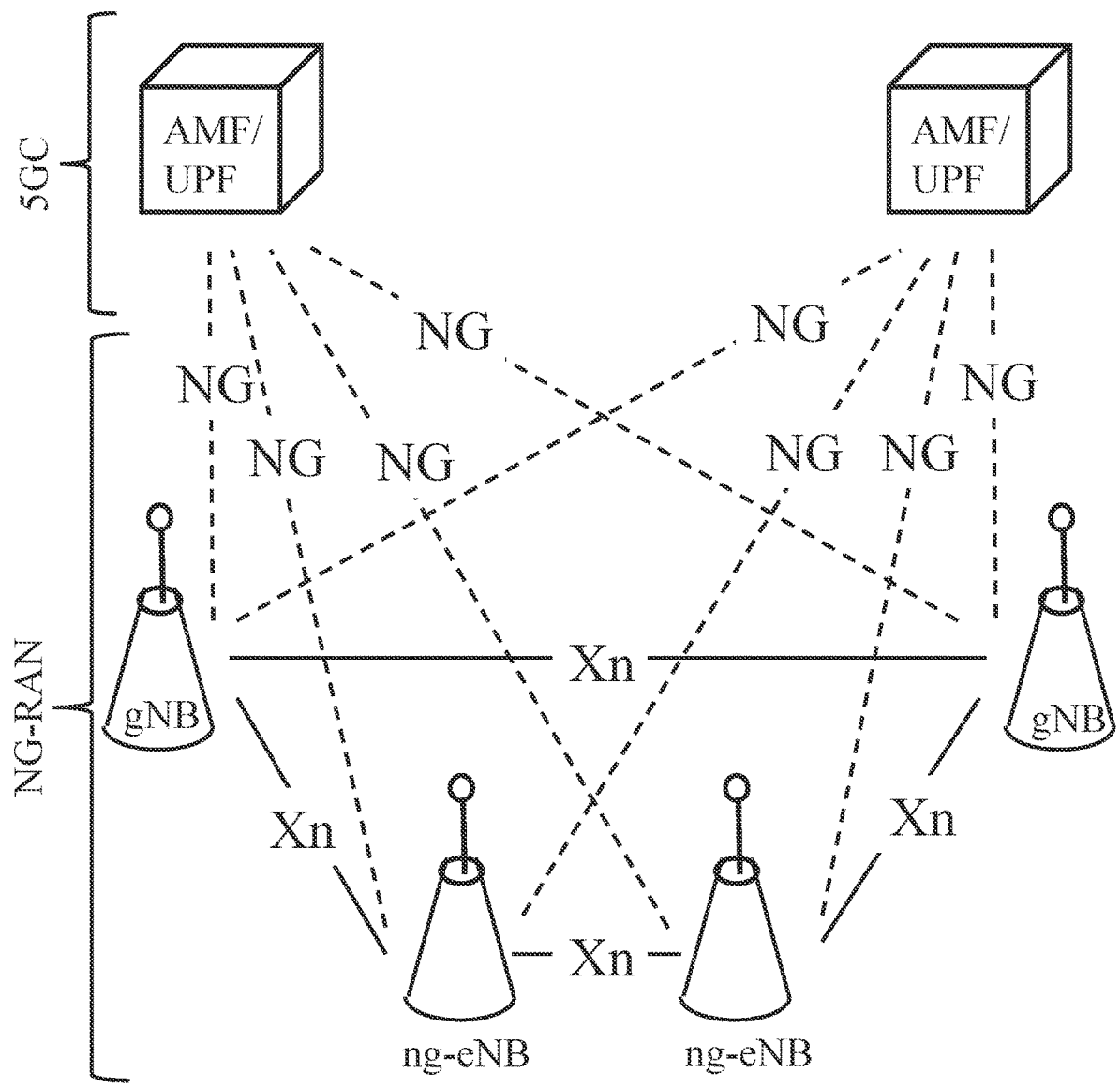
FIGS. 4 to 9 illustrate diagrams of embodiments of communication systems.

Turning now to FIG. 4, illustrated is a system level diagram of an embodiment of a communication system such as a 5G/NR communications system. The NR architecture includes terminology such as "NG" (or "ng") denoting new radio, "eNB" denoting an LTE eNodeB, "gNB" denoting a NR base station ("BS," one NR BS may correspond to one or more transmission/reception points), a "RAN" denoting a radio access network, "5GC" denoting a Fifth Generation ("5G") core network, "AMF" denoting an access and mobility management function, and "UPF" denoting a user plane function. The lines between network nodes represent interfaces therebetween.

FIG. 4 illustrates an overall NR architecture with eNBs and gNBs communicating over various interfaces. In particular, the gNBs and ng-eNBs are interconnected with each other by an Xn interface. The gNBs and ng-eNBs are also connected by NG interfaces to the 5GC, more specifically to the AMF by the NG-C interface and to the UPF by the NG-U interface, as described in 3GPP Technical Specification ("TS") 23.501, which is incorporated herein by reference. The architecture and the F1 interface for a functional split are defined in 3GPP TS 38.401, which is incorporated herein by reference.

Figure 5:
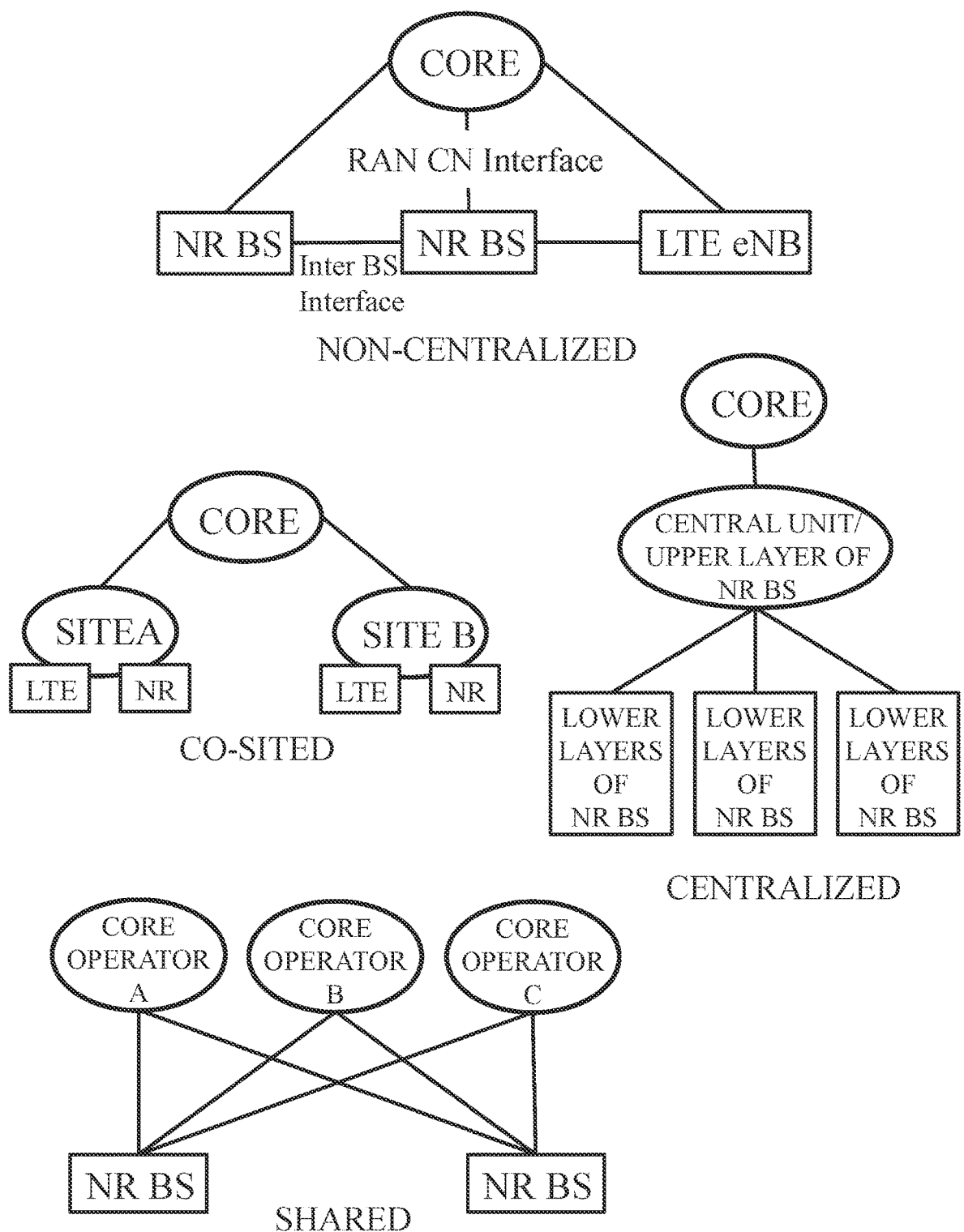

Turning now to FIG. 5, illustrated is a system level diagram of an embodiment of a communication system including 5G/NR deployment examples. The communication system illustrates non-centralized, co-sited, centralized, and shared deployments of NR base stations, LTE base stations, lower levels of NR base stations, and NR base stations connected to core networks.

Both standalone and non-standalone NR deployments may be incorporated into the communication system. The standalone deployments may be single or multi-carrier (e.g., NR carrier aggregation) or dual connectivity with a NR PCell and a NR PSCell. The non-standalone deployments describe a deployment with LTE PCell and NR. There may also be one or more LTE secondary cells ("SCells") and one or more NR SCells.

The following deployment options are captured in NR Work Item Description (RP-170847, "New WID on New Radio Access Technology," NTT DoCoMo, March, 2018). The work item supports a single connectivity option including NR connected to 5G-CN ("CN" representing a core network, option 2 in TR 38.801 section 7.1). The work item also supports dual connectivity options including E-UTRA-NR DC ("E-UTRA" represents evolved universal mobile telecommunications system ("UNITS") terrestrial radio access, and "DC" represents dual connectivity) via an evolved packet core ("EPC") where the E-UTRA is the master (Option 3/3a/3x in TR 38.801 section 10.1.2), E-UTRA-NR DC via 5G-CN where the E-UTRA is the master (Option 7/7a/7x in TR 38.801 section 10.1.4), and NR-E-UTRA DC via 5G-CN where the NR is the master (Option 4/4A in TR 38.801 section 10.1.3). Dual connectivity is between E-UTRA and NR, for which the priority is where E-UTRA is the master and the second priority is where NR is the master, and dual connectivity is within NR. The aforementioned standards are incorporated herein by reference.

Figure 6:
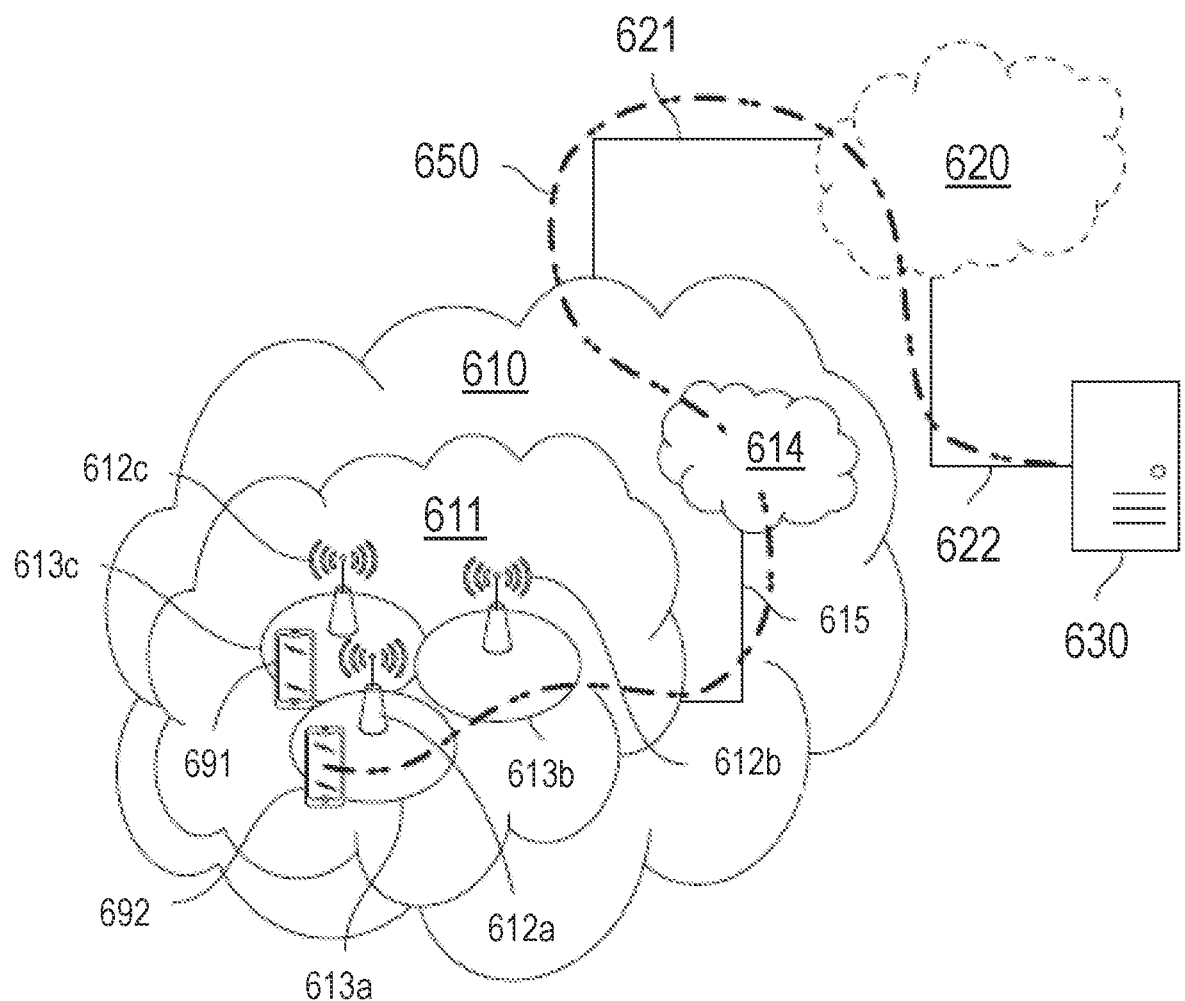

Turning now to FIG. 6, illustrated is a system level diagram of an embodiment of a communication system including a communication network (e.g., a 3GPP-type cellular network) 610 connected to a host computer 630. The communication network 610 includes an access network 611, such as a radio access network, and a core network 614. The access network 611 includes a plurality of base stations 612a, 612b, 612c (also collectively referred to as 612), such as NB s, eNBs, gNBs or other types of wireless access points, each defining a corresponding coverage area 613a, 613b, 613c (also collectively referred to as 613). Each base station 612a, 612b, 612c is connectable to the core network 614 over a wired or wireless connection 615. A first user equipment ("UE") 691 located in coverage area 613c is configured to wirelessly connect to, or be paged by, the corresponding base station 612c. A second user equipment 692 in coverage area 613a is wirelessly connectable to the corresponding base station 612a. While a plurality of user equipment 691, 692 are illustrated in this example, the disclosed embodiments are equally applicable to a situation where a sole user equipment is in the coverage area or where a sole user equipment is connecting to the corresponding base station 612.

The communication network 610 is itself connected to the host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the communication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may include two or more sub-networks (not shown).

The communication system of FIG. 6 as a whole enables connectivity between one of the connected user equipment 691, 692 and the host computer 630. The connectivity may be described as an over-the-top ("OTT") connection 650. The host computer 630 and the connected user equipment 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected user equipment 691. Similarly, the base station 612 need not be aware of the future routing of an outgoing uplink communication originating from the user equipment 691 towards the host computer 630. A location server as described herein may be resident in the host computer 630 or elsewhere such as within the core network 614 or even distributed down to a base station or user equipment.

Figure 7:
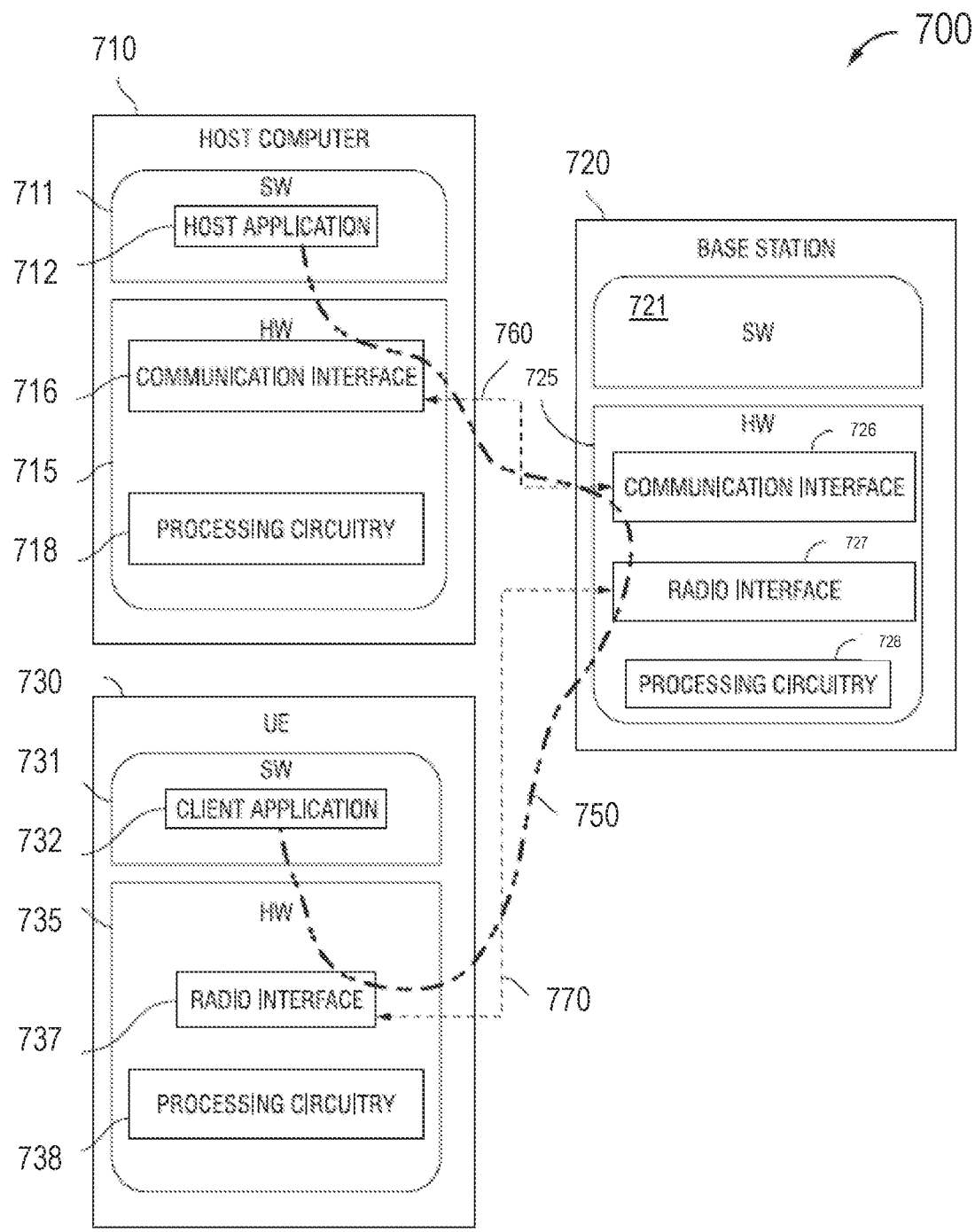

Turning now to FIG. 7, illustrated is a block diagram of an embodiment of a communication system 700. In the communication system 700, a host computer 710 includes hardware 715 including a communication interface 716 configured to set up and maintain a wired or wireless connection with an interface of a different communication device of the communication system 700. The host computer 710 further includes processing circuitry (a processor) 718, which may have storage and/or processing capabilities. In particular, the processing circuitry 718 may include one or more programmable processors, application-specific integrated circuits, field programmable gate arrays or combinations of these (not shown) adapted to execute instructions. The host computer 710 further includes software 711, which is stored in or accessible by the host computer 710 and executable by the processing circuitry 718. The software 711 includes a host application 712. The host application 712 may be operable to provide a service to a remote user, such as a user equipment ("UE") 730 connecting via an OTT connection 750 terminating at the user equipment 730 and the host computer 710. In providing the service to the remote user, the host application 712 may provide user data which is transmitted using the OTT connection 750.

The communication system 700 further includes a base station 720 provided in the communication system 700 including hardware 725 enabling it to communicate with the host computer 710 and with the user equipment 730. The hardware 725 may include a communication interface 726 for setting up and maintaining a wired or wireless connection with an interface of a different communication device of the communication system 700, as well as a radio interface 727 for setting up and maintaining at least a wireless connection 770 with a user equipment 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 7) of the communication system 700 and/or through one or more intermediate networks outside the communication system 700. In the embodiment shown, the hardware 725 of the base station 720 further includes processing circuitry (a processor) 728, which may include one or more programmable processors, application-specific integrated circuits, field programmable gate arrays or combinations of these (not shown) adapted to execute instructions. The base station 720 further has software 721 stored internally or accessible via an external connection.

The user equipment 730 includes hardware 735 having a radio interface 737 configured to set up and maintain a wireless connection 770 with a base station 720 serving a coverage area in which the user equipment 730 is currently located. The hardware 735 of the user equipment 730 further includes processing circuitry (a processor) 738, which may comprise one or more programmable processors, application-specific integrated circuits, field programmable gate arrays or combinations of these (not shown) adapted to execute instructions. The user equipment 730 further includes software 731, which is stored in or accessible by the user equipment 730 and executable by the processing circuitry 738. The software 731 includes a client application 732. The client application 732 may be operable to provide a service to a human or non-human user via the user equipment 730, with the support of the host computer 710. In the host computer 710, an executing host application 712 may communicate with the executing client application 732 via the OTT connection 750 terminating at the user equipment 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

It is noted that the host computer 710, base station 720 and user equipment 730 illustrated in FIG. 7 may be identical to the host computer 630, one of the base stations 612a, 612b, 612c and one of the user equipment 691, 692 of FIG. 6, respectively. This is to say, the inner workings of these entities may be as shown in FIG. 7 and independently, the surrounding network topology may be that of FIG. 6.

In FIG. 7, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the user equipment 730 or from the service provider operating the host computer 710, or both. While the OTT connection 750 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 750 between the host computer 710 and user equipment 730, in response to variations in the measurement results. The measurement procedure and/or the network functionality for reconfiguring the OTT connection 750 may be implemented in the software 711 of the host computer 710 or in the software 731 of the user equipment 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing, etc.; the reconfiguring need not affect the base station 720, and it may be unknown or imperceptible to the base station 720. Such procedures and functionalities may be known and practiced in the art. In certain embodiments, measurements may involve proprietary user equipment signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors, etc. Additionally, the communication system 700 may employ the principles as described herein. Additionally, location services may be provided in accordance with a location server embodied in the host computer 710 and base station 720 and user equipment 730.

Figure 8:
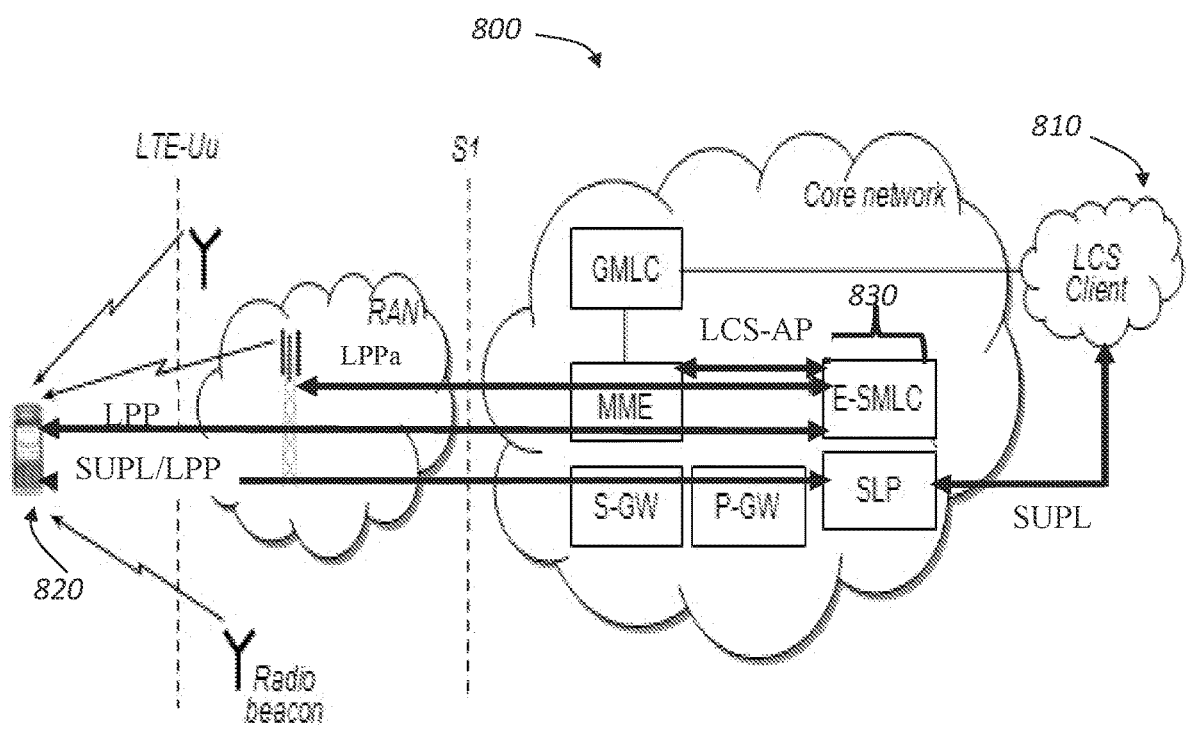

Turning now to FIG. 8, illustrated is a diagram of an embodiment of a communication system 800. The communication system 800 includes a location service ("LCS") client 810, a LCS target device 820 and a LCS server 830. The LCS server 830 is a physical or logical entity managing positioning for an LCS target device 820 by collecting measurements and other location information, assisting the LCS target device 820 with measurements when necessary, and estimating the LCS target location. An LCS client 810 is a software and/or hardware entity that interacts with the LCS server 830 for the purpose of obtaining location information for one or more LCS target devices 820 (i.e., the entities being positioned). The LCS clients 810 may also reside in the LCS target devices 820 themselves. The LCS client 810 sends a request to the LCS server 830 to obtain location information, and the LCS server 810 processes and serves the requests and sends the positioning result and optionally a velocity estimate to the LCS client 810. A positioning request can be originated from the LCS target device 820 or a network node or external client.

The position calculation can be conducted, for example, by the LCS server 830 (e.g., E-SMLC or SUPL location platform ("SLP") in LTE) or the user equipment or radio access node. The former approach corresponds to the user equipment-assisted positioning mode when it is based on user equipment measurements, whilst the latter corresponds to the user equipment-based positioning mode.

In LTE, the positioning measurements for observed time difference of arrival ("OTDOA") are performed by the user equipment using at least positioning reference signals ("PRS"). The user equipment is configured with OTDOA assistance information containing PRS related information, for instance, the PRS occasion length and the PRS occasion periodicity. The user equipment can further be configured with dense PRS (e.g. densePrsConfig). The dense PRS indicates that the user equipment (e.g., LCS target device 820) supports a subset of the additional PRS configurations that includes a PRS positioning occasion length (Nprs) with any value, without limitation, larger than six milliseconds ("ms") and up to 160 ms (in addition to the legacy PRS occasion length of 1, 2, 4 and 6 subframes). The Nprs is the number of downlink subframes in a PRS positioning occasion. The PRS positioning occasion is transmitted with certain PRS periodicity (Tprs), for instance, 5 ms, 10 ms, 20 ms, 40 ms, 80 ms, 160 ms, 320 ms, 640 ms and 1280 ms.

As set forth herein, a method of signal design for positioning (e.g., of a user equipment) is based on phase noise levels, defined as subcarrier controlling. Signal design here refers to configurations of an Orthogonal Frequency Division Multiplexing ("OFDM") signal based on waveform numerology. Subcarrier controlling includes adjusting, without limitation, subcarrier spacing, number of subcarriers, and power allocation on subcarriers. By adopting a proper signal design under different phase noise conditions, positioning accuracy and robustness is improved.

Under IOT industrial use cases, there are two main multi-lateration positioning methods based on Time Difference of Arrival ("TDOA"), as described further herein below. For both positioning techniques, phase noise sources exist in transceivers, either on the user equipment side or the base station side. For IoT in a low power consumption network with low cost transceivers, the oscillator phase noise is highly impactful.

A time of arrival estimate such as the Observed Time Difference of Arrival ("OTDOA") is a downlink user equipment-assisted positioning technique, in which a user equipment measures Time of Arrival ("TOA") of reference signals such as Positioning Reference Signals ("PRS") transmitted by multiple transmitting base stations. Then, the TDOA information is determined and may be reported to a location server to compute a target location.

Another time of arrival estimate such as the Uplink-Time Difference of Arrival ("U-TDOA") is an uplink network-based positioning technique, in which user equipment sends reference signals such as uplink Sounding Reference Signals ("SRS") to multiple base stations. The reference signals are received by highly sensitive receivers stored in base stations. Then TDOA information is determined and may be reported to a location server to compute a target location.

Solutions such as a TDOA positioning method rely on TOA measurements to determine positioning and location information. The positioning accuracy in TOA depends on various factors such as network deployment, signal propagation environment, hardware impairments, etc. The goal of 5G positioning system to reach sub-meter accuracy as described in 3GPP TR 38.913, "Study on Scenarios and Requirements for Next Generation Access Technologies," which is incorporated herein by reference, for indoor scenarios is a challenge.

Phase noise is inherently becoming a bigger problem with new 5G use cases, wherever, for instance, low power low cost devices are used. Low cost low power oscillators typically have higher phase noise. Such use cases include IOT environments, machine-to-machine communications ("M2M"), etc.

However, understanding of how phase noise affects TOA estimation performance are still being evaluated and a challenge exists on how to handle a poor positioning case with high phase noise level. Moreover, the positioning system is typically not robust for poor signal-to-interference-plus-noise ratio ("SINR") conditions.

The signal design solution (e.g., with subcarrier controlling) set forth herein enhances positioning performance based on phase noise levels, or estimates thereof. The subcarrier controlling solution introduced herein implements a certain set of subcarrier configuration corresponding to phase noise level. Adaptively enhancing (e.g., optimizing) and updating the subcarrier configuration can be done by the location server or other communication node until a satisfactory positioning performance is achieved.

For example, when phase noise level is detected as high in a positioning system, the reference signal design can be adjusted from the following options. In one option, non-uniform power allocation is adopted by applying a windowing solution on the subcarrier spectrum. In another option, subcarrier spacing is increased. In a third option, bandwidth is increased (e.g., the total number of subcarriers employed). In addition, any parameter that affects a reference signal waveform for positioning, responsive to a level of phase noise, can be adjusted for the reference signal design including, without limitation, OFDM cyclic prefix ("CP") length, modulation type and symbol duration.

A solution introduced herein can be implemented by adopting a subcarrier configuration table such as TABLE 1 illustrated below. The table can be stored and updated by a location server or other communication node according to detected phase noise levels. Power control of the subcarrier, which refers to a windowing scheme such as rectangular windowing, inverse Chebyshev windowing and other windowing methods will be described later.

TABLE 1

Subcarrier Configuration Table of Phase Noise Level

| Phase Noise Level (decibels ("dB")) | Subcarrier Spacing ($15*2^n$ kHz) | Power Control of Subcarrier (windowing scheme) | Total Number of Subcarriers N | TOA Accuracy (m^2) |
|---|---|---|---|---|
| Level 1 | n1 | Scheme 1 | N1 | $\sigma_1^2$ |
| Level 2 | n2 | Scheme 2 | N2 | $\sigma_2^2$ |
| Level 3 | n3 | Scheme 3 | N3 | $\sigma_3^2$ |
| . | . | . | . | . |
| . | . | . | . | . |
| . | . | . | . | . |

The positioning accuracy, which can be referred to as TOA estimation accuracy variance, is proportional to phase noise level. After phase noise information is reported to, for instance, a location server, the location server can determine the set of subcarrier configurations for re-configuring the reference signal. The table can be updated according to realistic measurements on TOA accuracy.

Advantages of the positioning process introduced herein can be summarized by the following points. The solution improves positioning performance when phase noise level is high, such as in an IOT environment, contributing to reaching a sub-meter goal for 5G systems. The robustness and flexibility of the positioning system is enhanced by adopting subcarrier controlling. The solution works well in an IOT kind of environment where the cost of transceivers is very low and hence the usage of low cost, poorly performing oscillators is high. The solution is relative straight forward to implement by manipulating signal design. The solution provides guidance on how phase noise affects positioning performance and relationships between phase noise and signal design. The system also holds well for time synchronization systems that use over the air TOA measurements for synchronizing timings. The phase noise-based power control of subcarriers is good for reducing inter-carrier interference, which is further beneficial for a multiple-input multiple-output ("MIMO") antenna system which has a tight requirement on phase precision. The power control solution provides instructions on positioning-related design including the hardware.

Figure 9:
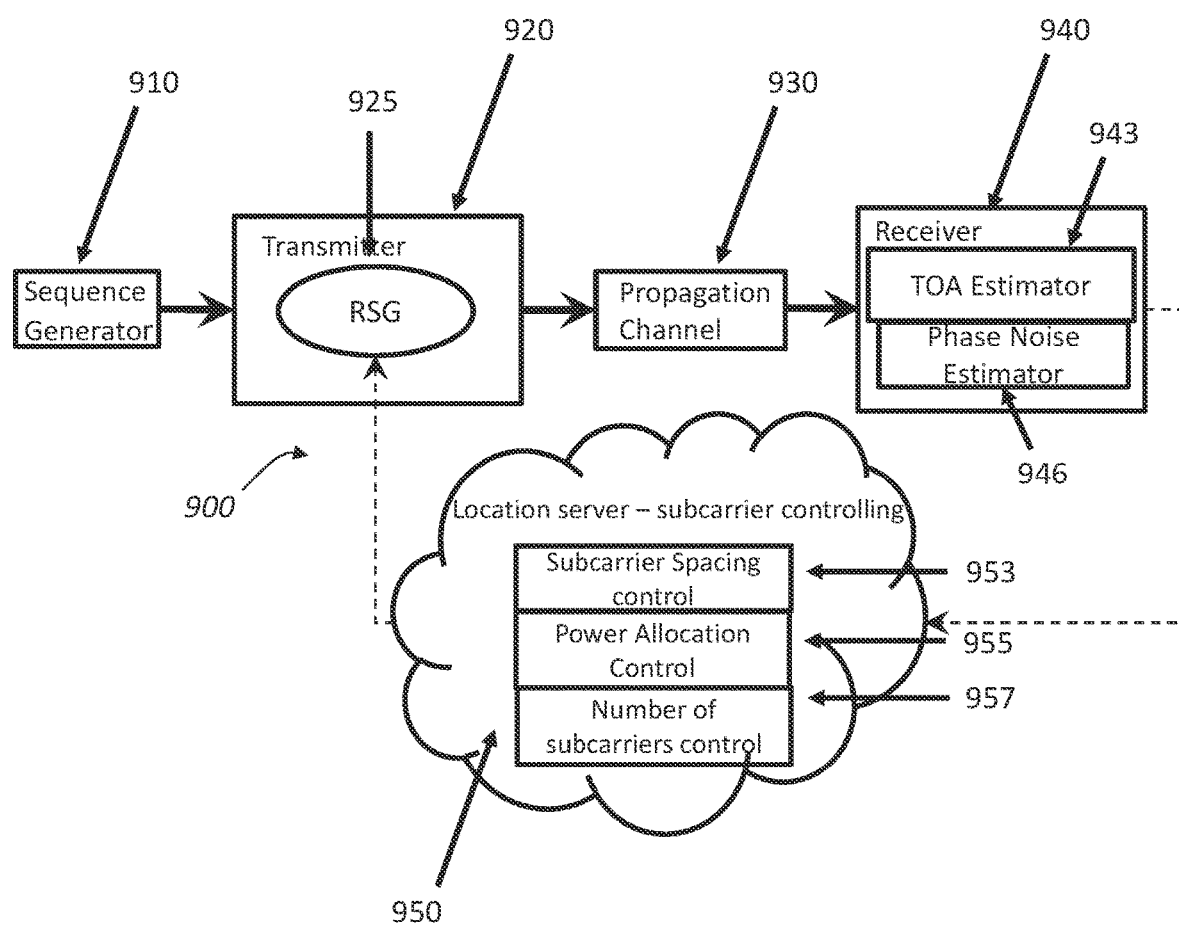

Turning now to FIG. 9, illustrated is a block diagram of an embodiment of a communication system 900. A receiver (or receiving node) that intends to estimate time of arrival also estimates phase noise level. Depending on the level of phase noise, the transmitter (or transmitting node) configures the power levels of the subcarrier of a reference signal.

As illustrated in FIG. 9, a sequence generator 910 transmits data including an information sequence to a transmitter 920. The transmitter 920, in turn, transmits a signal over a propagation channel 930 (e.g., a wireless channel) to a receiver 940. The receiver 940 includes a TOA estimator 943 and a phase noise estimator 946. The receiver 940 in cooperation with a location server 950 transmits subcarrier spacing control 953, power allocation control 955, and/or number of subcarriers control 957 based on an estimate of phase noise back to the transmitter 920 to enable the transmitter 920 control a reference signal generator ("RSG") 925 therein. The positioning method employs the TOA and phase noise estimation, and subcarrier controlling by, for instance, reconfiguring the reference signal by changing power allocation, subcarrier spacing, and total number of the subcarriers. The method is adapted until TOA estimation reaches a target accuracy.

Figure 10A:
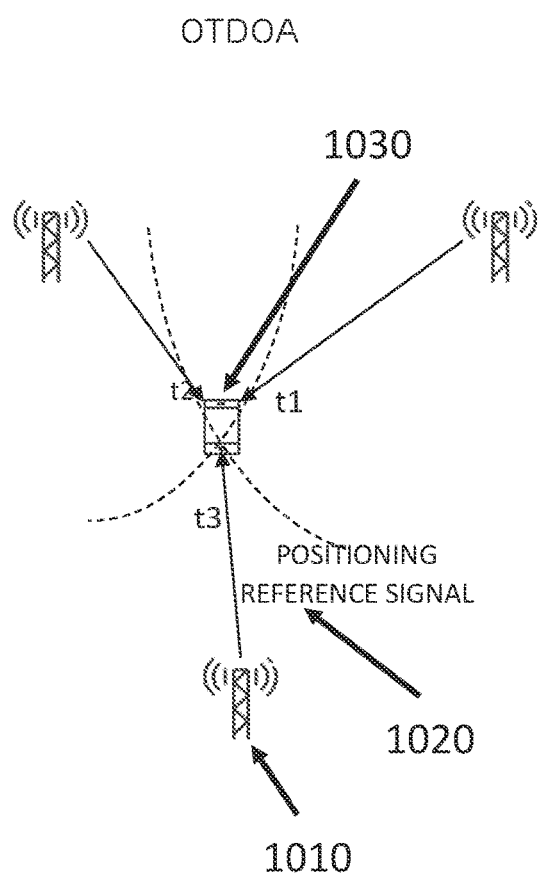
FIGS. 10A and 10B illustrate diagrams of example positioning methods based on observed time difference of arrival ("OTDOA") and uplink-time difference of arrival ("U-TDOA"), respectively.
Figure 10B:
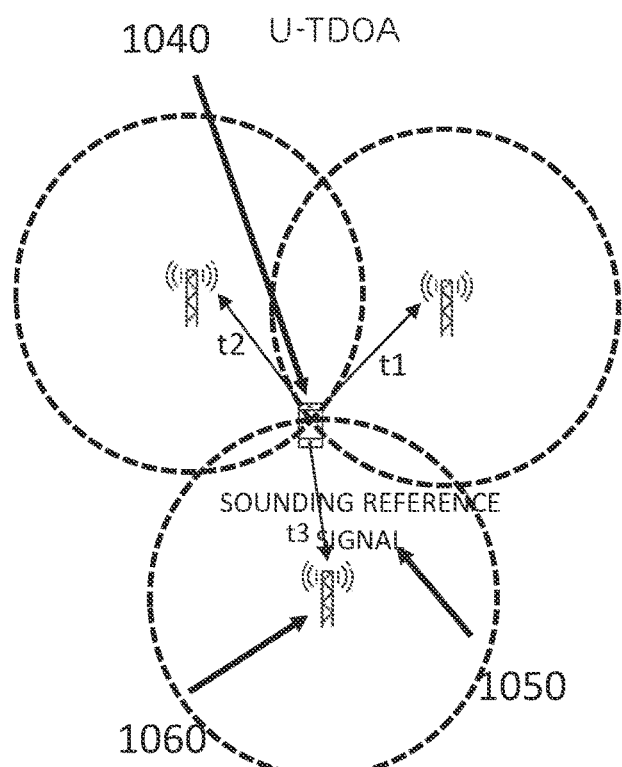

Turning now to FIGS. 10A and 10B, illustrated are diagrams of example positioning methods based on OTDOA and U-TDOA, respectively. In OTDOA (see FIG. 10A), a base station (e.g., a transmitting node, one of which is designated 1010) sends a positioning reference signal (or reference signal and may also be referred to as a modified reference signal) 1020, and the user equipment (e.g., a receiving node) 1030 performs TOA and phase noise estimation. Alternatively, in U-TDOA (see FIG. 10B), the user equipment 1040 (e.g., a transmitting node) sends a sounding reference signal (or reference signal and may also be referred to as a modified reference signal) 1050, and base station (e.g., a receiving node, one of which is designated 1060) performs the estimation analysis. While the base station and user equipment transmit and receive signals, the designation as transmitting node and/or receiving node set forth in the disclosure are with respect to transmitting or receiving the reference signal (or modified reference signal).

Figure 11:
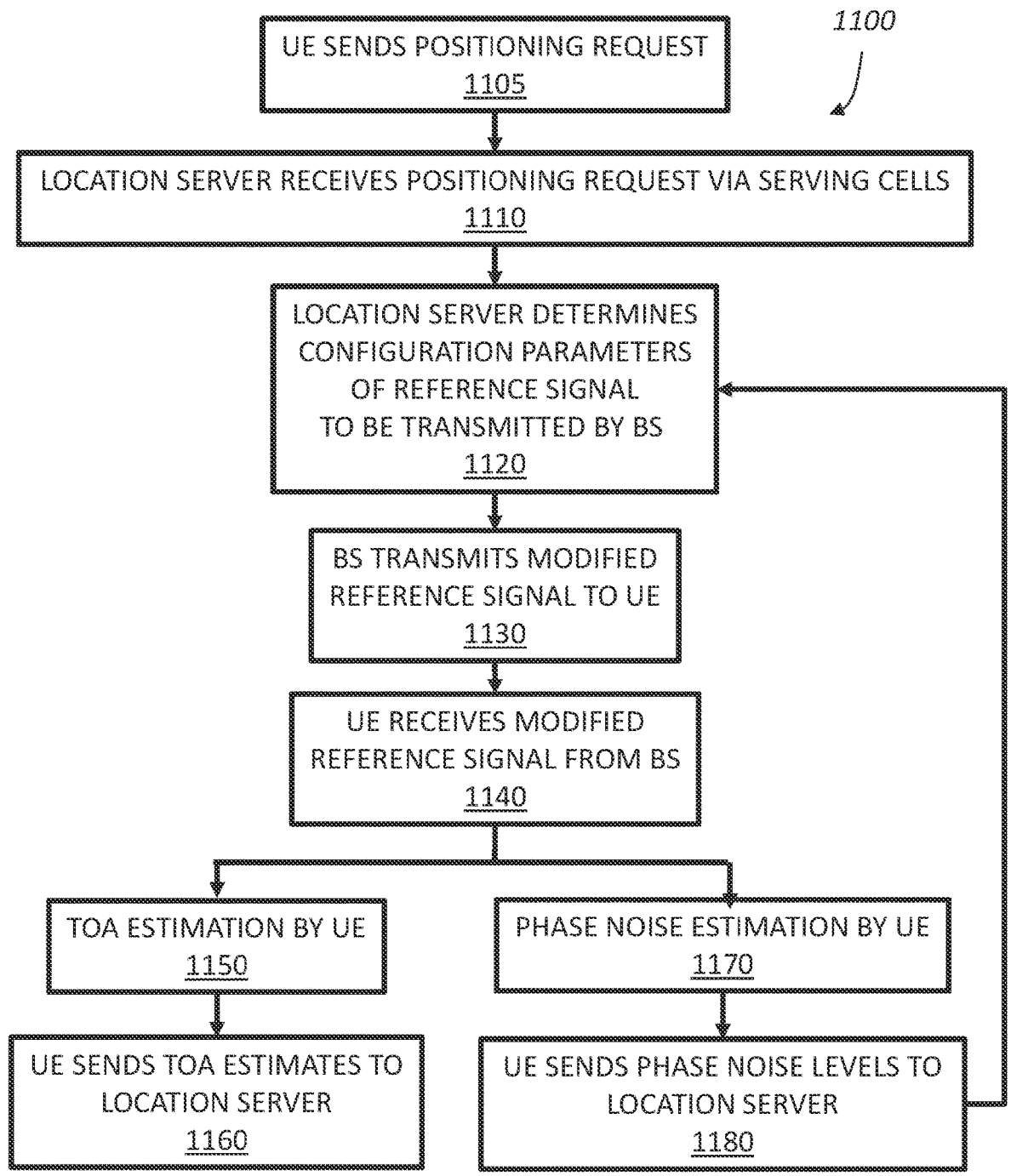
FIG. 11 illustrates a flow diagram of an embodiment of a method for subcarrier controlling in OTDOA.
Figure 12:
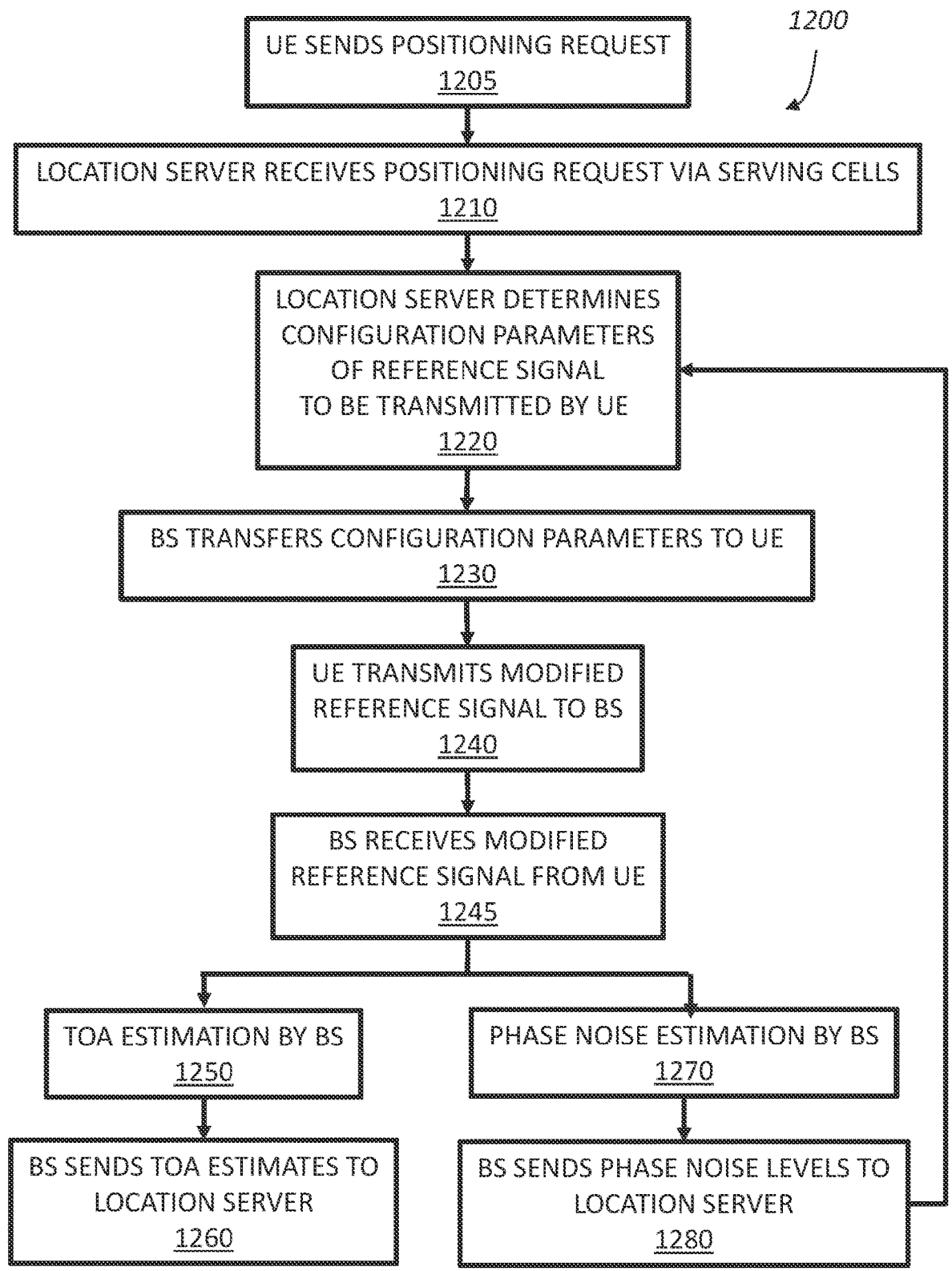
FIG. 12 illustrates a flow diagram of an embodiment of a method for subcarrier controlling in U-TDOA.

To describe the positioning solution based on the two positioning techniques above, the flow diagrams illustrated in FIGS. 11 and 12 describe the working flow with subcarrier controlling of OTDOA and U-TDOA, respectively. The flow diagrams illustrated in FIGS. 11 and 12 demonstrate positioning methods of OTDOA and U-TDOA, including the subcarrier controlling solution introduced herein.

Turning now to FIG. 11, illustrated is a flow diagram of an embodiment of a method 1100 for subcarrier controlling in OTDOA. In a step or module 1105, a user equipment ("UE", e.g., a receiving node) sends a positioning request to, for instance, a location server. In a step or module 1110, the location server receives the positioning request via serving cells. In a step or module 1120, the location server determines configuration parameters of a reference signal to be transmitted by a base station ("BS", e.g., a transmitting node). In a step or module 1130, the base station transmits a modified reference signal (after application of the configuration parameter(s)) to the user equipment. In a step or module 1140, the user equipment receives the modified reference signal from the base station. In a step or module 1150, a TOA estimate is made by the user equipment. In a step or module 1160, the user equipment sends the TOA estimate to the location server via the base station. Also, in a step or module 1170, phase noise estimation is performed by the user equipment. In a step or module 1180, the user equipment sends phase noise levels to the location server via the base station. The method 1100 then returns to the step or module 1120.

Figure 13:
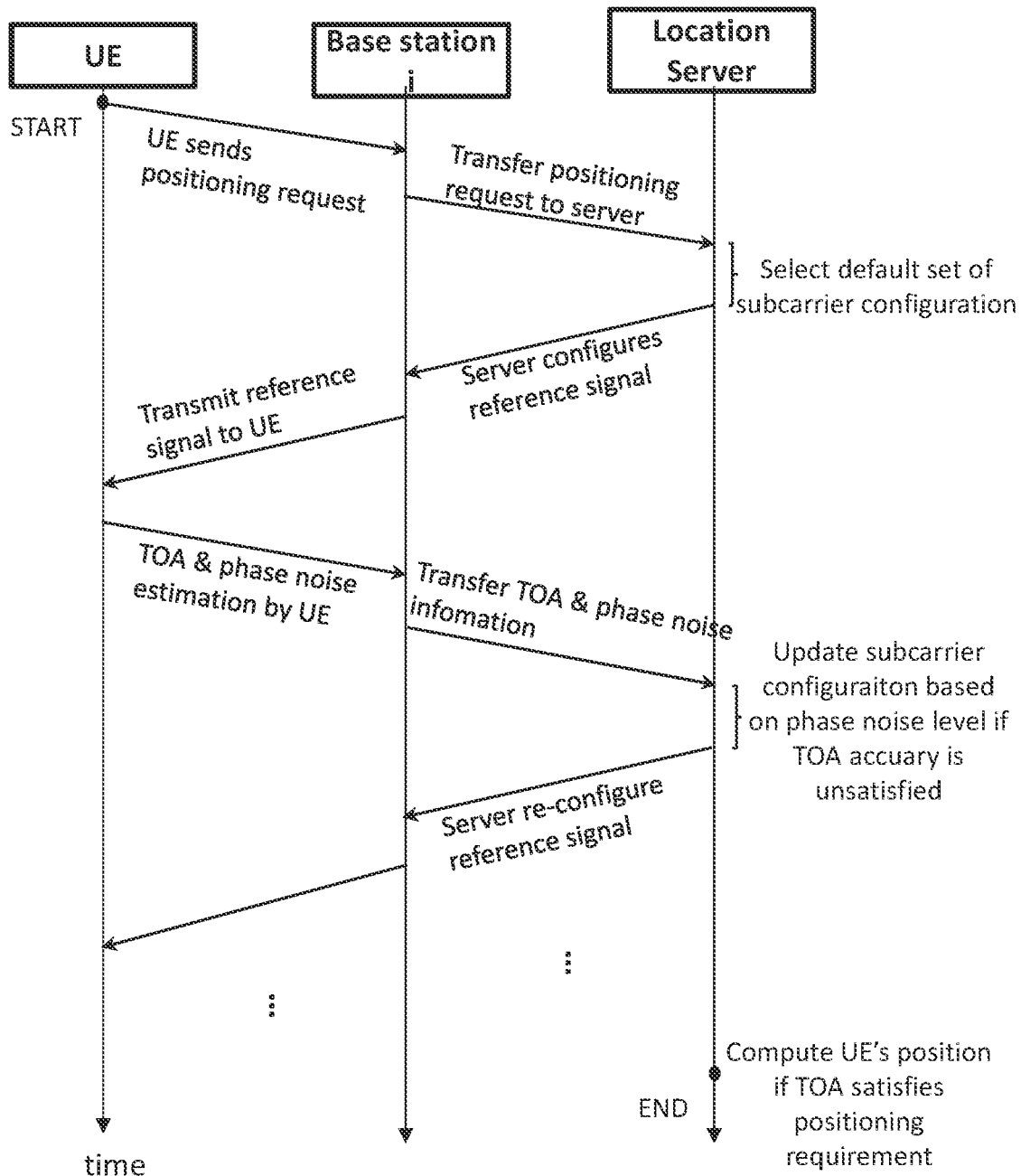
FIGS. 13 and 14 illustrate signaling diagrams of embodiments demonstrating positioning systems and methods associated with OTDOA and U-TDOA, respectively.
Figure 14:
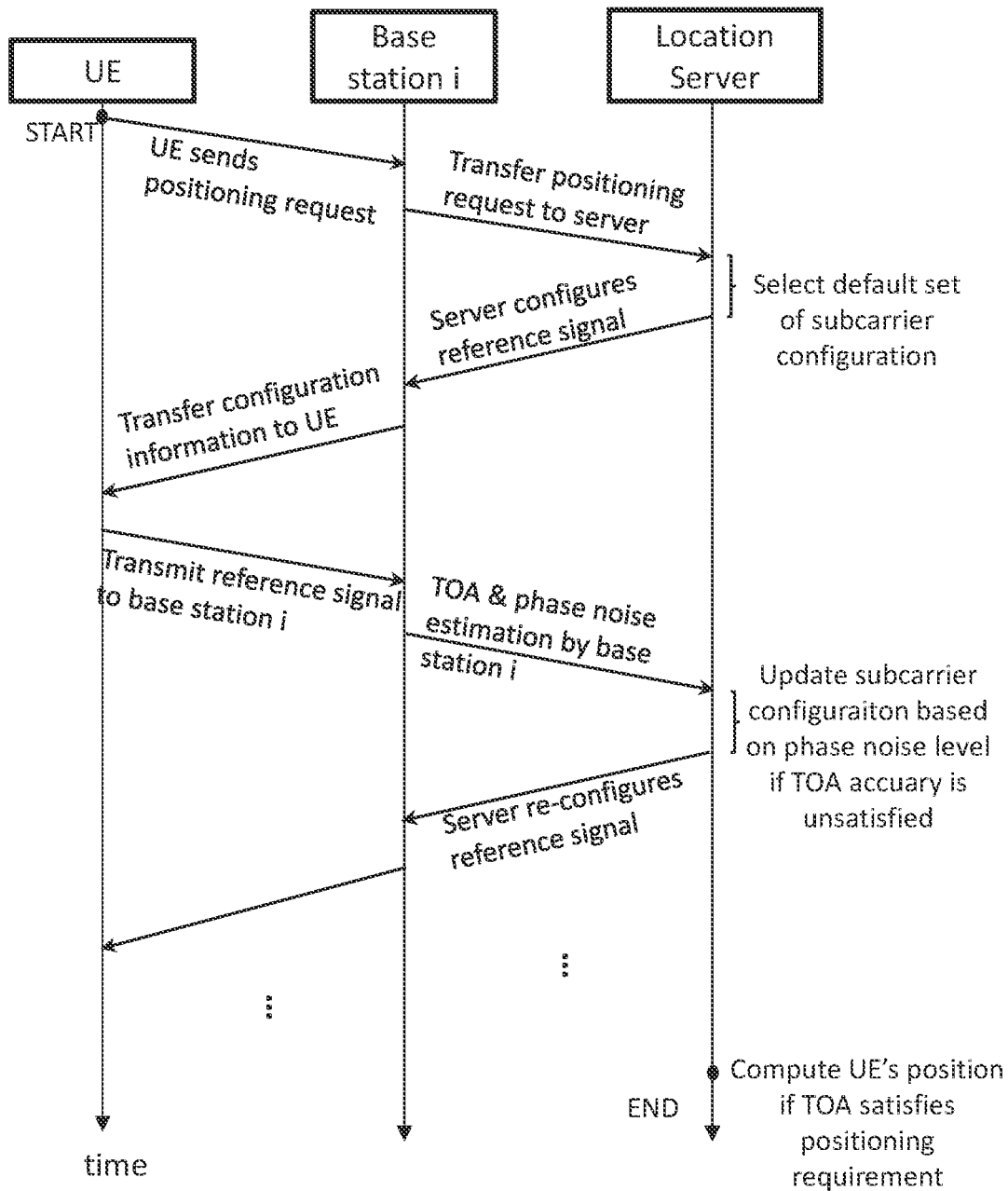

Turning now to FIG. 12, illustrated is a flow diagram of an embodiment of a method 1200 for subcarrier controlling in U-TDOA. In a step or module 1205, a user equipment ("UE", e.g., a transmitting node) sends a positioning request to, for instance, a location server. In a step or module 1210, the location server receives the positioning request via serving cells. In a step or module 1220, the location server determines configuration parameters of a reference signal to be transmitted by the user equipment. In a step or module 1230, a base station ("BS", e.g., a receiving node) transfers configuration parameters to the user equipment. In a step or module 1240, the user equipment transmits a modified reference signal (after application of the configuration parameter(s)) to the base station. In a step or module 1245, the base station receives the modified reference signal from the user equipment. In a step or module 1250, a TOA estimation is performed by base station. In a step or module 1260, the base station sends TOA estimates to the location server. Also, a phase noise estimation is performed by the base station in a step or module 1270. In a step or module 1280, the base station sends phase noise levels to the location server. The method 1200 then returns to the step or module 1220. FIGS. 13 and 14 illustrate signaling diagrams of embodiments demonstrating positioning systems and methods associated with OTDOA and U-TDOA, respectively, analogous to the method 1100 of FIG. 11 and the method 1200 of FIG. 12, respectively.

Complementary results are now described to explain subcarrier controlling. For example, when the phase noise level is detected as high in a positioning system, subcarrier controlling may, without limitation, adopt a non-uniform power allocation scheme with distributing power towards edged subcarriers on spectrum, increase subcarrier spacing, and increase bandwidth (e.g., the total number of subcarriers).

With respect to estimation theory described in Kay, Steven M., "Fundamentals of statistical signal processing, volume I: estimation theory," 1993, which is incorporated herein by reference, the Cramer-Rao Lower Bound is referred to as an indicator of TOA estimation accuracy. This application also refers to the result as described in Luan, Dehan, "Fundamental Performance Limits on Time of Arrival Estimation Accuracy with 5G Radio Access," 2017, which is incorporated herein by reference, i.e., the Cramer-Rao Lower Bound for jointly TOA and phase noise estimation, to support the subcarrier controlling solution described above.

As derived in Luan, the discrete-time signal model with existing phase noise is:

$$r(nT_s) = \{x(nT_s) * h(nT_s)\} \cdot e^{j\varphi(nTS)} + w(nT_s), w(nT_s) \sim CN(0, \sigma^2).$$

Here the phase noise is modelled as a Wiener process, $\varphi_n = \varphi_{n-1} + \delta_n$, $\delta_n \sim N(0, \sigma_\delta^2)$ $$\theta \triangleq [\tau_d \vec{\varphi}]^T = [\tau_d \varphi_1 \ldots \varphi_{N-1}]^T.$$

The signal model in matrix form is:

$$r = P \cdot F^H \cdot A \cdot \Gamma \cdot F_L \cdot h + w = u + w.$$

The fisher information matrix is:

$$I(\theta) = \amalg_c + \amalg_p,$$

where $$\amalg_c = \frac{2}{\sigma^2} \text{Re} \left\{ \begin{array}{cc} q^H \cdot q & -q^H \cdot Q \cdot b_i \\ -b_i^H \cdot Q^H \cdot q & Q^H \cdot Q_{(2:N,2:N)} \end{array} \right\},$$

$$\amalg_P = -\frac{1}{\sigma_\delta^2} \begin{bmatrix} 0 & 0 & 0 & 0 & & 0 & 0 & 0 \\ 0 & -1 & 1 & 0 & \ldots & 0 & 0 & 0 \\ 0 & 1 & -2 & 1 & & 0 & 0 & 0 \\ & \vdots & & & \ddots & & \vdots & \\ 0 & 0 & 0 & 0 & & -2 & 1 & 0 \\ 0 & 0 & 0 & 0 & \ldots & 1 & -2 & 1 \\ 0 & 0 & 0 & 0 & & 0 & 1 & -1 \end{bmatrix}.$$

The Cramer-Rao Lower Bound is taking the inverse of fisher information matrix and the first element in the inverse matrix indicates TOA estimation accuracy, i.e., $$\text{var}(\tau_d) \geq CRLB = [I(\theta)]_{(1,1)}^{-1}.$$

Figure 15:
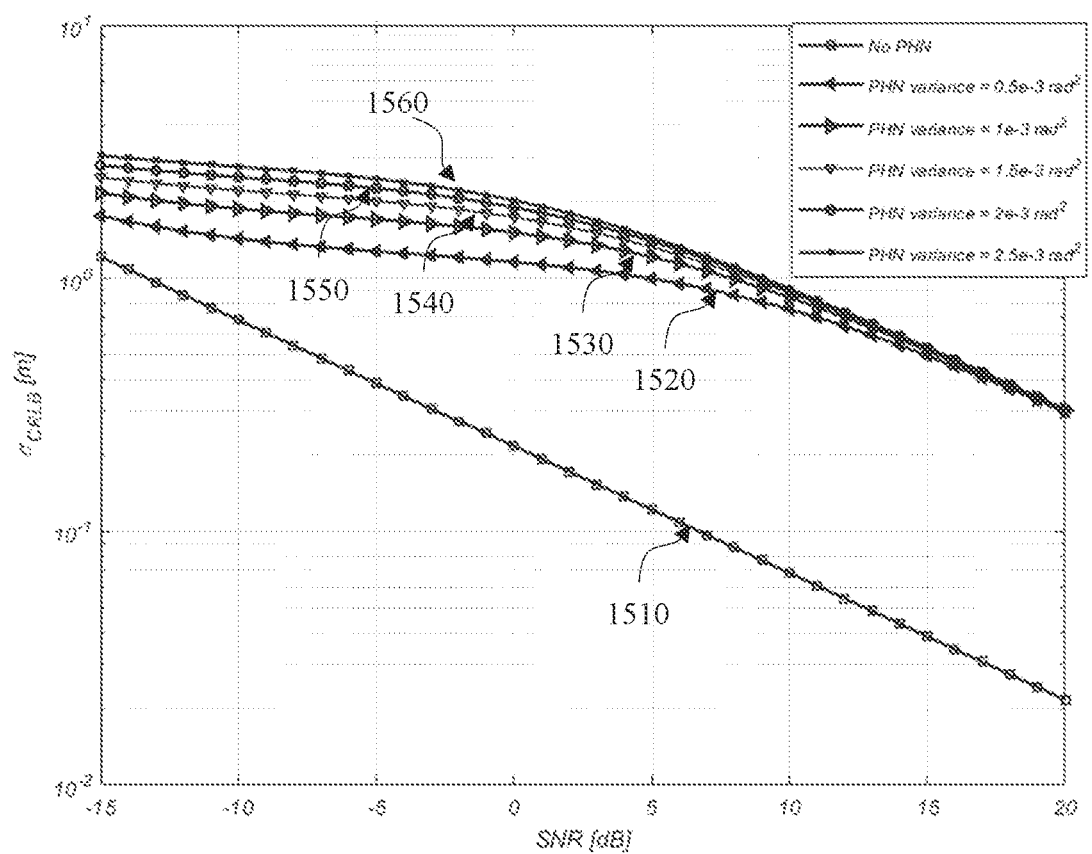
FIG. 15 illustrates a graphical representation of an example impact of phase noise on positioning performance.
Figure 17:
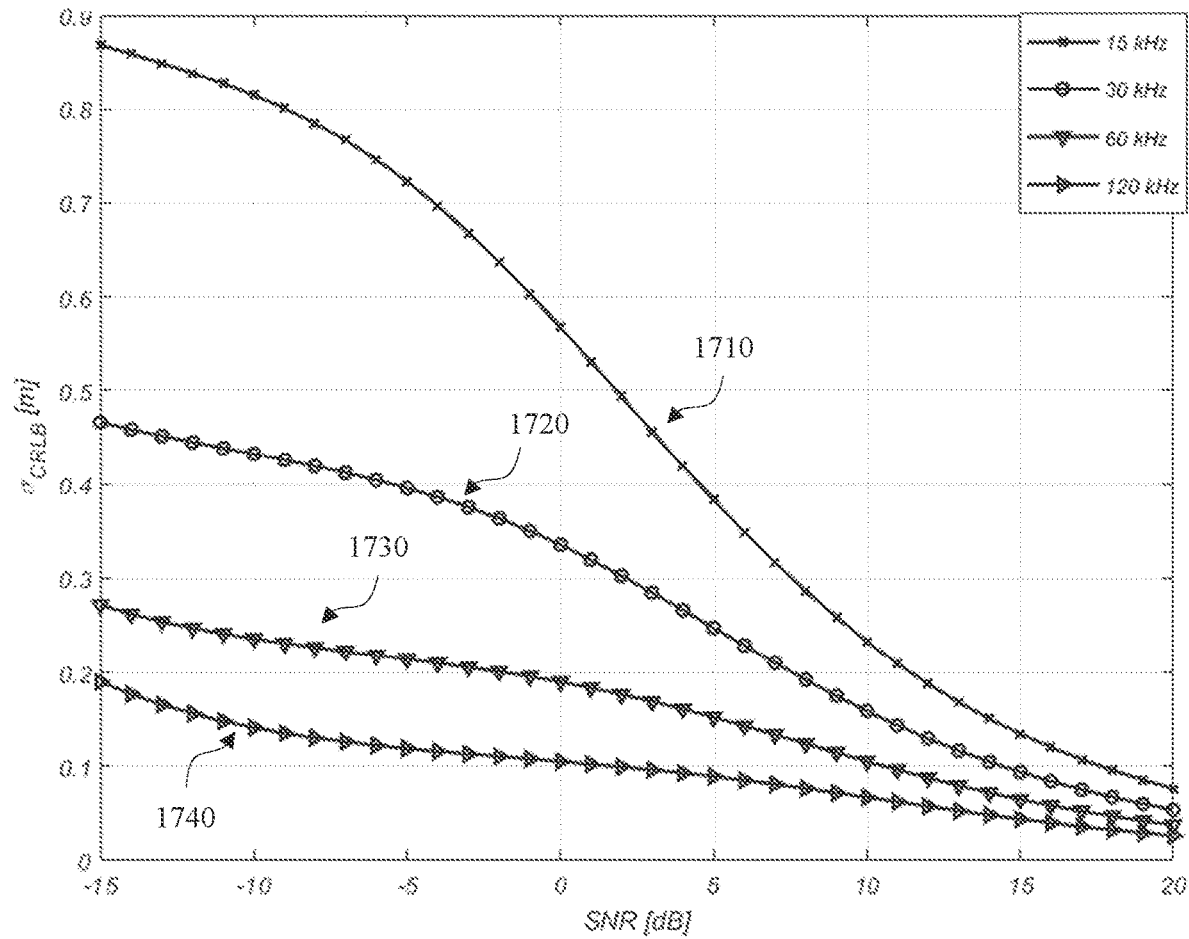
FIG. 17 illustrates a graphical representation demonstrating that larger subcarrier spacing improves positioning performance.
Figure 18:
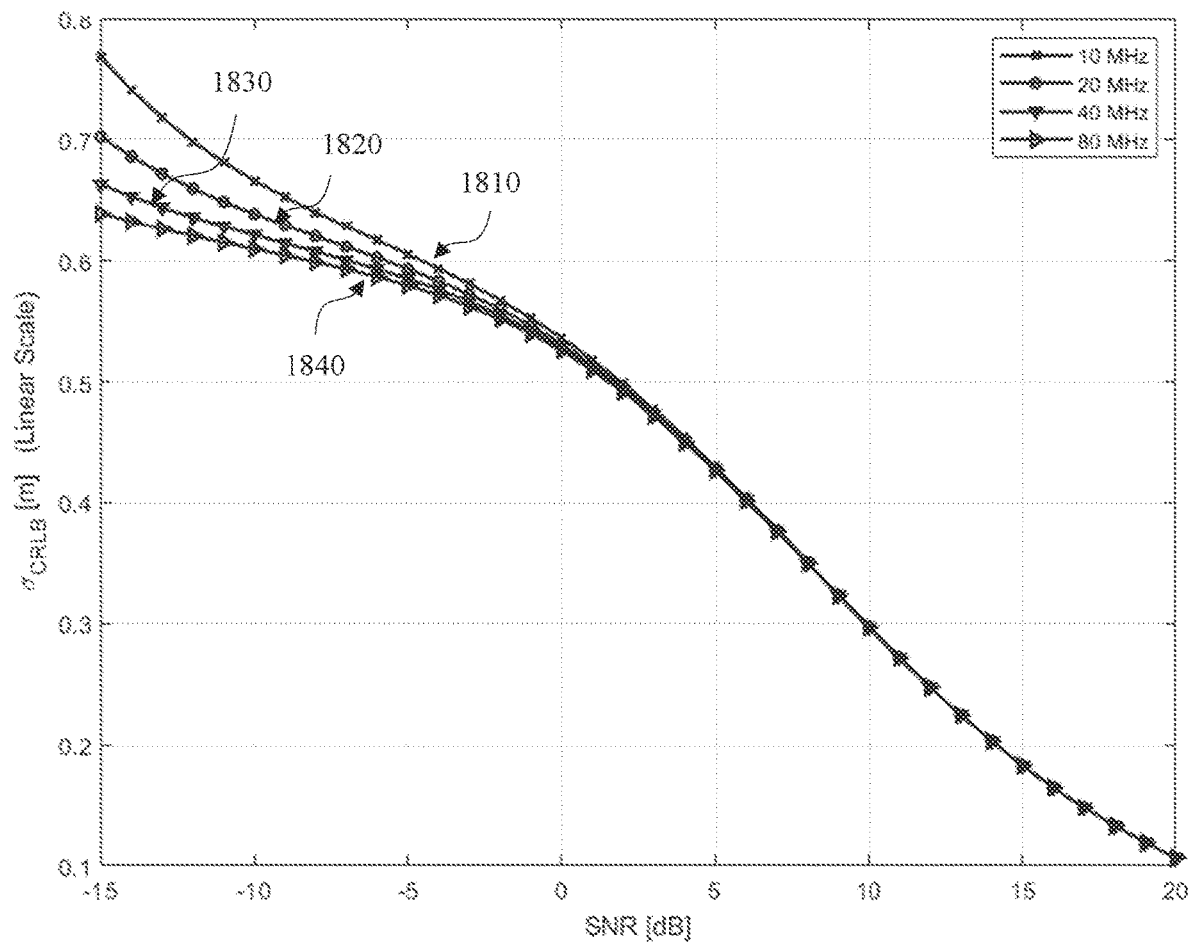
FIG. 18 illustrates a graphical representation demonstrating that larger bandwidth gives improvements at low signal-to-noise ("SNR") region.

Based on the derived Cramer-Rao Lower Bound, simulations are performed to explore the relationship between phase noise level and TOA estimation accuracy in Additive White Gaussian Noise ("AWGN") channel as illustrated in FIG. 15. Moreover, the relationship between subcarrier controlling and TOA estimation accuracy is illustrated, as shown in FIG. 16, FIG. 17 and FIG. 18.

The description of the following FIGUREs summarize observations on subcarrier controlling simulation.

FIG. 15 illustrates a graphical representation of an example impact of phase noise on positioning performance. Especially towards low signal-to-noise ratio ("SNR") region, larger phase noise level can overcome TOA accuracy. The FIGURE demonstrates a variance exploit for TOA estimation with Wiener phase noise ("PHN"). Plot 1510 includes no phase noise; plot 1520 includes a phase noise variance of 0.5e-3 rad$^2$; plot 1530 includes a phase noise variance of 1e-3 rad$^2$; plot 1540 includes a phase noise variance of 1.5e-3 rad$^2$; plot 1550 includes a phase noise variance of 2e-3 rad$^2$; plot 1560 includes a phase noise variance of 2.5e-3 rad$^2$.

Figure 16:
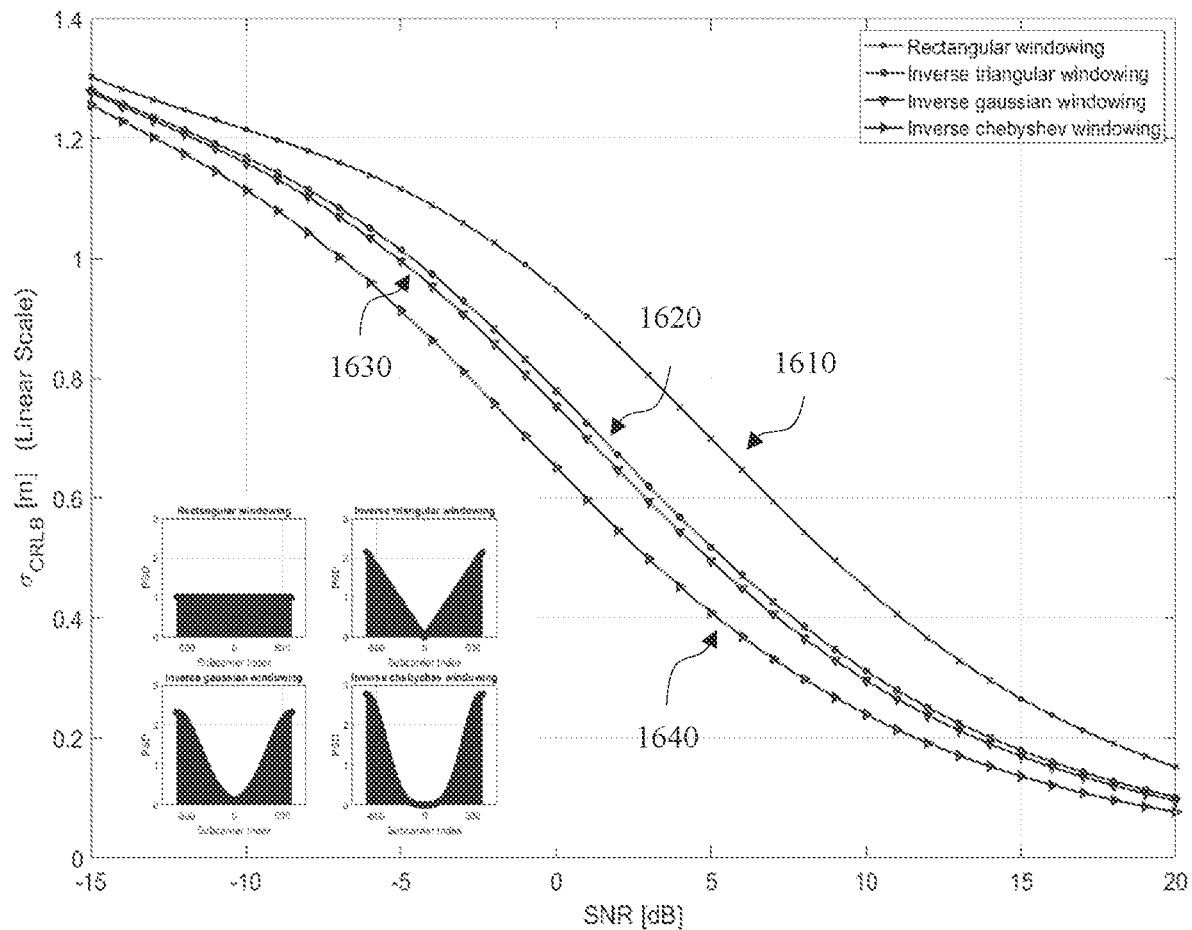
FIG. 16 illustrates a graphical representation demonstrating that more power allocated to subcarriers at the edges gives more improvement.

In FIG. 16, a windowing method is applied on power spectrum to realize non-uniform power allocation (total power is controlled as the same for a fair comparison). FIG. 16 illustrates a graphical representation demonstrating that more power allocated to subcarriers at the edges gives more improvement, i.e. inverse Chebyshev windowing. The FIGURE demonstrates windowing on a power spectrum exploit for TOA estimation with a Wiener phase noise of 1e-3 rad$^2$. Plot 1610 includes rectangular windowing; plot 1620 includes inverse triangular windowing; plot 1630 includes Gaussian windowing; plot 1640 includes Chebyshev windowing.

In FIG. 17, according to numerology considerations as described in Zaidi, Ali A., et al., "Waveform and numerology to support 5G services and requirements," IEEE Communications Magazine 54.11, 2016, 90-98, which is incorporated herein by reference, subcarrier spacing is increased by 2-integer times, which shows that larger subcarrier spacing improves positioning performance. Thus, FIG. 17 illustrates a graphical representation demonstrating that larger subcarrier spacing improves positioning performance. The FIGURE demonstrates a subcarrier spacing exploit on TOA estimation with a Wiener phase noise of 1e-3 rad$^2$. Plot 1710 includes 15 kilohertz ("kHz") subcarrier spacing; plot 1720 includes 30 kHz subcarrier spacing; plot 1730 includes 60 kHz subcarrier spacing; plot 1740 includes 120 kHz subcarrier spacing.

In FIG. 18, larger bandwidth gives improvements at low SNR region. For high SNR, changing bandwidth is not significant under high phase noise level. Thus, FIG. 18 illustrates a graphical representation demonstrating that larger bandwidth gives improvements at low SNR region. The FIGURE demonstrates a bandwidth exploit for TOA estimation with a Wiener phase noise of 1e-3 rad$^2$ in the AWGN channel. Plot 1810 includes 10 megahertz ("MHz") bandwidth; plot 1820 includes 20 MHz bandwidth; plot 1830 includes 40 MHz bandwidth; plot 1840 includes 80 MHz bandwidth.

Thus, as introduced herein, subcarrier controlling of waveform design that is robust to phase noise level is achieved by, for instance, adjusting power allocation on subcarriers, enhancing (e.g., optimizing) subcarrier spacing, and bandwidth to enhance positioning performance. The waveform of a reference signal is redesigned considering phase noise influence in the positioning system and method. In addition, any parameter that affects a reference signal waveform for positioning, responsive to a level of phase noise, can be adjusted for the reference signal design including, without limitation, OFDM cyclic prefix ("CP") length, modulation type and symbol duration.

In an embodiment, signal design for positioning is based on phase noise of a communication node such as a user equipment (or any wireless device) for a time of arrival such as OTDOA. A phase noise estimator in a receiving terminal provides a phase noise estimate to an entity that decides signal parameters of a transmitted signal based on the phase noise levels provided by the estimator. The signal design for positioning may be based on phase noise of base station for U-TDOA. The power allocation to subcarriers of the reference signal for positioning purposes may be based on the phase noise. The control of subcarrier spacing of the reference signal may be based on phase noise of a receiver. The total number of sub-carriers may be adjusted based on phase noise of the receiver. An inverse Chebyshev window gives good performance for subcarrier power allocation for positioning purposes in presence of phase noise at receiver. The phase noise estimator output may be used in a positioning context.

For purposes of illustration, an estimate of the level of phase noise (e.g., phase noise detection and estimation) of a reference signal may be determined, for instance, in a transceiver using techniques such as, without limitation, joint iterative detection and adaptive estimation including expectation maximization ("EM") algorithms, Kalman filtering, and least mean square ("LMS"). Also, an estimate of a time of arrival (e.g., TOA estimation) for a reference signal may be performed, without limitation, with a maximum likelihood ("ML") algorithm-based estimator (e.g., a peak-detection-based estimator, thresholding-based estimator), two stage estimation under multipath non-line-of-sight channels, and deconvolution estimation.

Also, the estimates may consider the communication path between a transmitter and receiver (e.g., user equipment and base station), and the estimation may represent this specific positioning path, which can change dynamically with time. The estimators may be embodied in processors such as digital signal processors, and evaluated within a transceiver (including measurements). For example, the measurements of phase noise dB level (phase noise exists both in the user equipment and base station transceivers through the path) for this specific communication path indicates how to configure the implementation table of the reference signal (see, e.g., TABLE 1 above).

Figure 19:
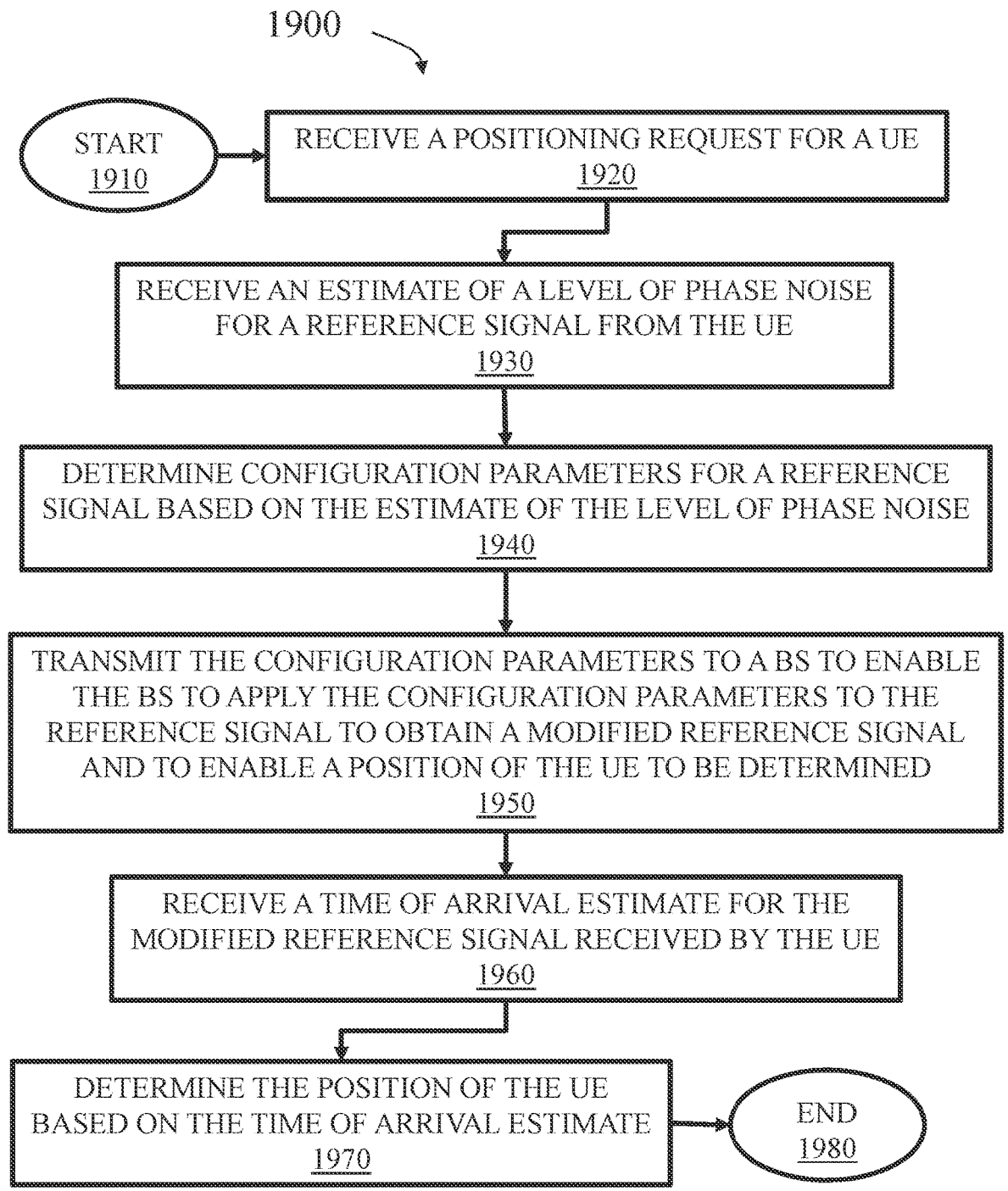
FIGS. 19 to 24 illustrate flow diagrams of embodiments of methods of operating communication systems.

Turning now to FIG. 19, illustrated is a flow diagram of an embodiment of a method 1900 of operating a communication system. The method 1900 may be employable to determine a position of a communication node such as a user equipment (or any type of wireless device) in a communication system based on, for instance, a time of arrival estimate of a reference signal. The method 1900 is operable on a communication node such as a location server in the communication system (e.g., a 5G communication system). The method 1900 begins at a start step or module 1910. At a step or module 1920, a positioning request for a user equipment ("UE", e.g., a receiving node) is received. The positioning request may originate from the user equipment or elsewhere in the communication system. At a step or module 1930, an estimate of a level of phase noise from a reference signal from the user equipment is received via, for instance, a base station (or any radio access node).

At a step or module 1940, configuration parameters for the reference signal based on the estimate of the level of phase noise are determined. In an embodiment, the configuration parameters for the reference signal may include at least one of subcarrier spacing of the reference signal, power allocation on subcarriers of the reference signal, and a total number of subcarriers of the reference signal. At a step or module 1950, the configuration parameters are transmitted to a base station ("BS", e.g., a transmitting node) to enable the base station to apply the configuration parameters to the reference signal to obtain a modified reference signal and to enable the position of the user equipment to be determined. At a step or module 1960, a time of arrival estimate is received for the modified reference signal received by the user equipment. At a step or module 1970, the position of the user equipment is determined based, at least in part, on the time of arrival estimate. The method 1900 ends at a step or module 1980.

Figure 20:
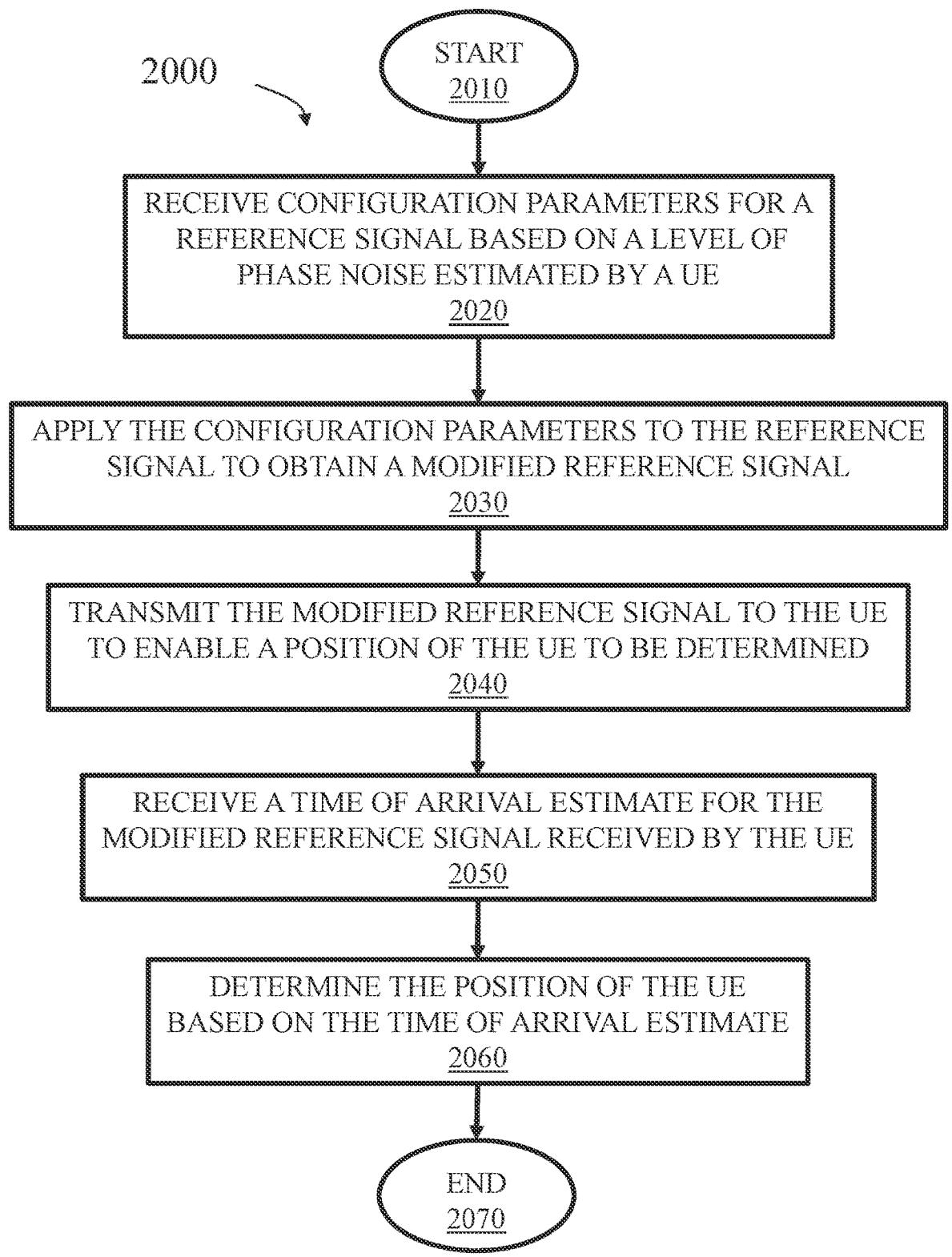

Turning now to FIG. 20, illustrated is a flow diagram of an embodiment of a method 2000 of operating a communication system. The method 2000 may be employable to determine a position of a communication node such as a user equipment (or any type of wireless device) in a communication system based on, for instance, a time of arrival estimate of a reference signal. The method 2000 is operable on a communication node such as a radio access node (e.g., a base station, e.g., a transmitting node) in the communication system (e.g., a 5G communication system). The method 2000 begins at a start step or module 2010. At a step or module 2020, configuration parameters for a reference signal are received (e.g., from a location server) based on a level of phase noise estimated by a user equipment ("UE", e.g., a receiving node). At a step or module 2030, the configuration parameters are applied to the reference signal to obtain a modified reference signal. In an embodiment, the configuration parameters for the reference signal may include at least one of subcarrier spacing of the reference signal, power allocation on subcarriers of the reference signal, and a total number of subcarriers of the reference signal.

At a step or module 2040, the modified reference signal is transmitted to the user equipment to enable a position of the user equipment to be determined. At a step or module 2050, a time of arrival estimate is received for the modified reference signal received by the user equipment. At a step or module 2060, the position of the user equipment is determined based, at least in part, on the time of arrival estimate. The method 2000 ends at a step or module 2070.

Figure 21:
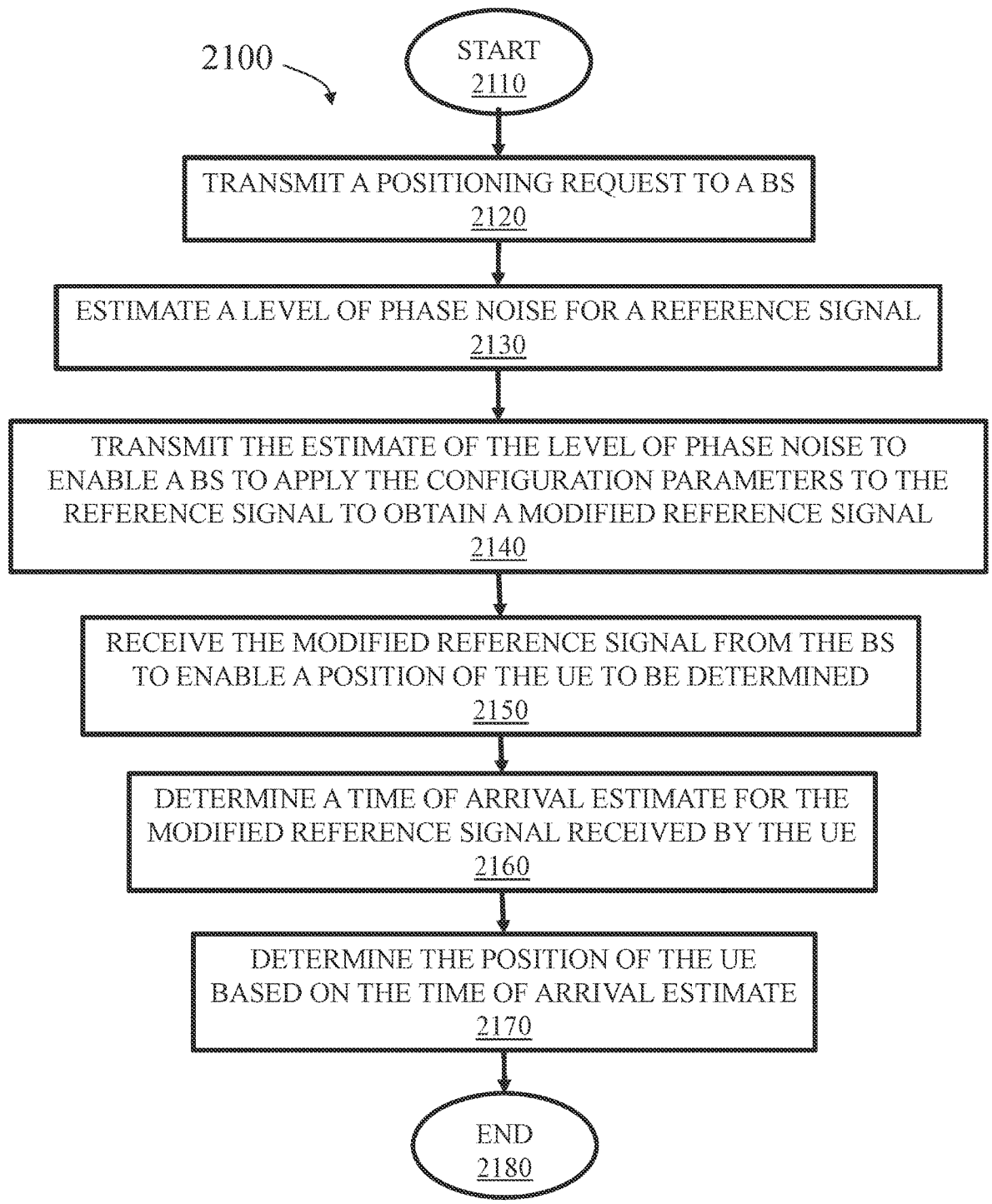

Turning now to FIG. 21, illustrated is a flow diagram of an embodiment of a method 2100 of operating a communication system. The method 2100 may be employable to determine a position of a communication node such as a user equipment (or any type of wireless device, e.g., a receiving node) in a communication system based on, for instance, a time of arrival estimate of a reference signal. The method 2100 is operable on a communication node such as a user equipment in the communication system (e.g., a 5G communication system). The method 2100 begins at a start step or module 2110. At a step or module 2120, a positioning request is transmitted to a base station ("BS", or any radio access node, e.g., a transmitting node). At a step or module 2130, a level of phase noise for a reference signal is estimated.

At a step or module 2140, the estimate of the level of phase noise is transmitted to enable the base station to apply configuration parameters to the reference signal to obtain a modified reference signal, the configuration parameters (e.g., received from a location server) being based on the estimate of the level of phase noise. In an embodiment, the configuration parameters for the reference signal may include at least one of subcarrier spacing of the reference signal, power allocation on subcarriers of the reference signal, and a total number of subcarriers of the reference signal.

At a step or module 2150, the modified reference signal is received from the base station to enable a position of the user equipment ("UE") to be determined. At a step or module 2160, a time of arrival estimate is determined for the modified reference signal received by the user equipment. At a step or module 2170, the position of the user equipment is determined based, at least in part, on the time of arrival estimate. The method 2100 ends at a step or module 2180.

Figure 22:
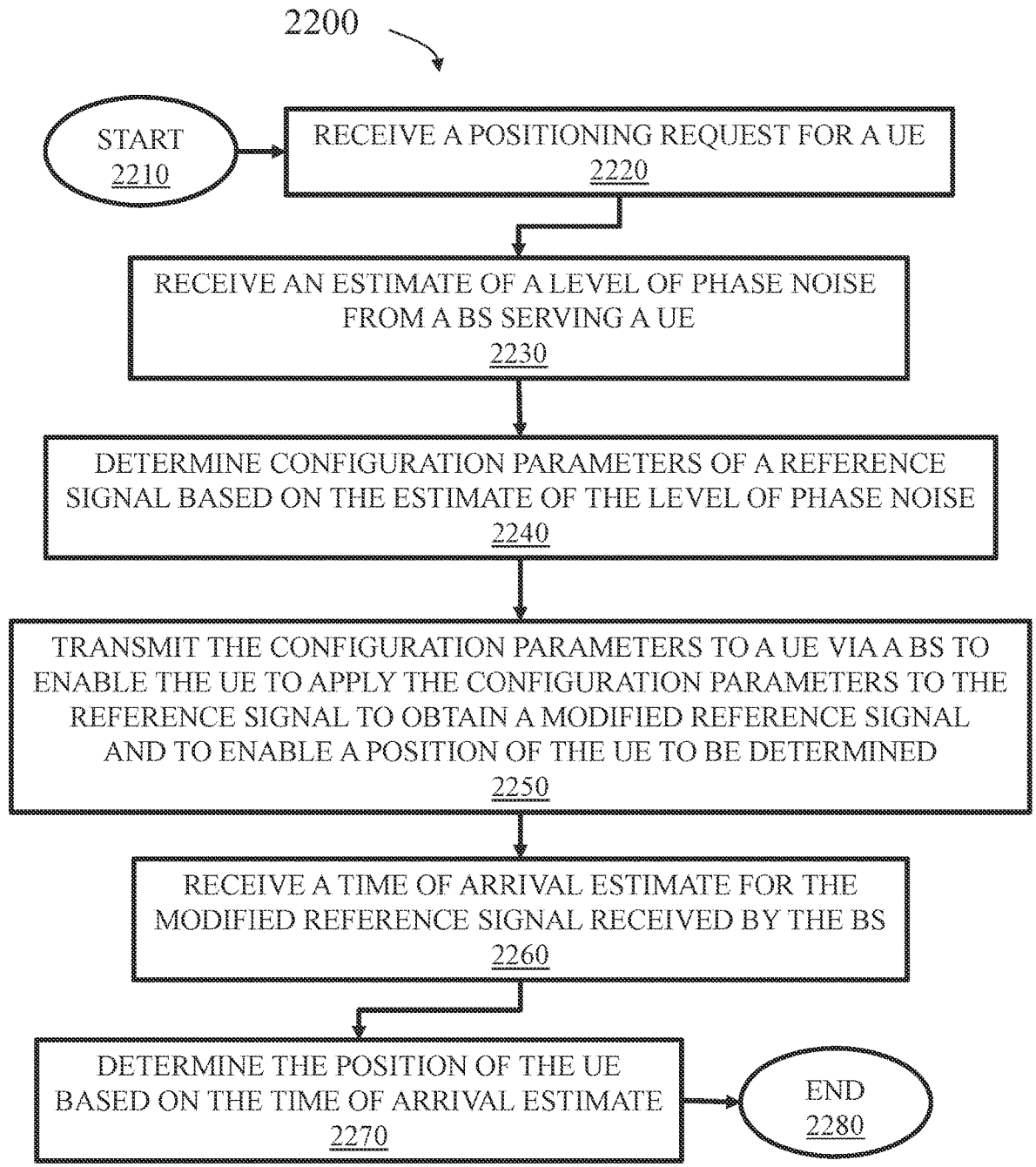

Turning now to FIG. 22, illustrated is a flow diagram of an embodiment of a method 2200 of operating a communication system. The method 2200 may be employable to determine a position of a communication node such as a user equipment (or any type of wireless device) in a communication system based on, for instance, a time of arrival estimate of a reference signal. The method 2200 is operable on a communication node such as a location server in the communication system (e.g., a 5G communication system). The method 2200 begins at a start step or module 2210. At a step or module 2220, a positioning request for a user equipment ("UE", e.g., a transmitting node) is received. The positioning request may originate from the user equipment or elsewhere in the communication system. At a step or module 2230, an estimate of a level of phase noise for a reference signal is received from a base station ("BS", or any radio access node, e.g., a receiving node) serving the user equipment.

At a step or module 2240, configuration parameters for the reference signal based on the estimate of the level of phase noise are determined. In an embodiment, the configuration parameters for the reference signal may include at least one of subcarrier spacing of the reference signal, power allocation on subcarriers of the reference signal, and a total number of subcarriers of the reference signal. At a step or module 2250, the configuration parameters are transmitted to the user equipment via, for instance, the base station to enable the user equipment to apply the configuration parameters to the reference signal to obtain a modified reference signal and to enable a position of the user equipment to be determined. At a step or module 2260, a time of arrival estimate is received for the modified reference signal received by the base station. At a step or module 2270, the position of the user equipment is determined based, at least in part, on the time of arrival estimate. The method 2200 ends at a step or module 2280.

Figure 23:
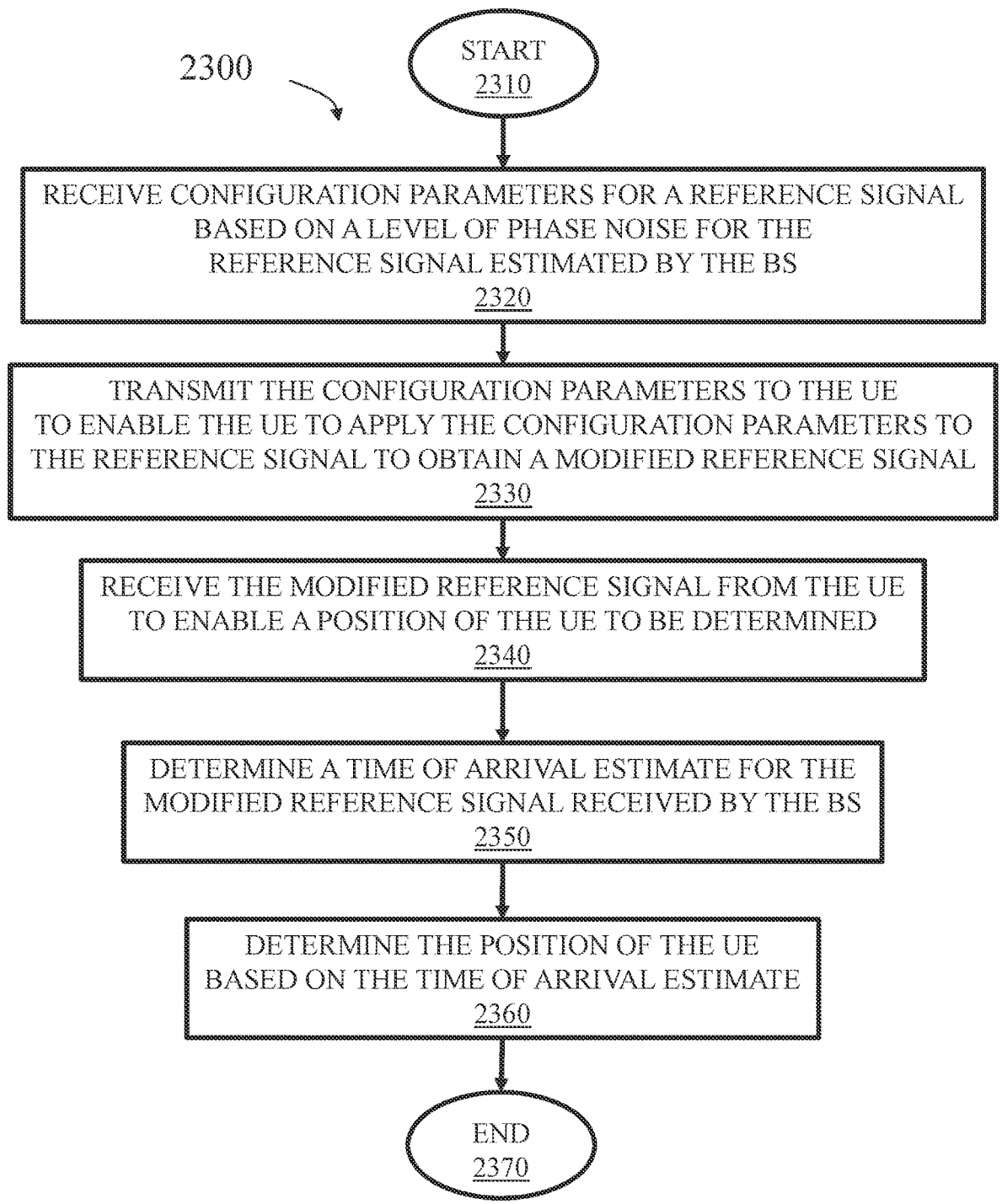

Turning now to FIG. 23, illustrated is a flow diagram of an embodiment of a method 2300 of operating a communication system. The method 2300 may be employable to determine a position of a communication node such as a user equipment (or any type of wireless device) in a communication system based on, for instance, a time of arrival estimate of a reference signal. The method 2300 is operable on a communication node such as a radio access node (e.g., a base station) in the communication system (e.g., a 5G communication system). The method 2300 begins at a start step or module 2310. At a step or module 2320, configuration parameters for a reference signal are received (e.g., from a location server) based on a level of phase noise for the reference signal estimated by the base station ("BS", e.g., a receiving node). At a step or module 2330, the configuration parameters are transmitted to the user equipment ("UE", e.g., a transmitting node) to enable the user equipment to apply the configuration parameters to the reference signal to obtain a modified reference signal. In an embodiment, the configuration parameters for the reference signal may include at least one of subcarrier spacing of the reference signal, power allocation on subcarriers of the reference signal, and a total number of subcarriers of the reference signal.

At a step or module 2340, the modified reference signal is received from the user equipment to enable a position of the user equipment to be determined. At a step or module 2350, a time of arrival estimate is determined for the modified reference signal received by the base station. At a step or module 2360, the position of the user equipment is determined based, at least in part, on the time of arrival estimate. The method 2000 ends at a step or module 2370.

Figure 24:
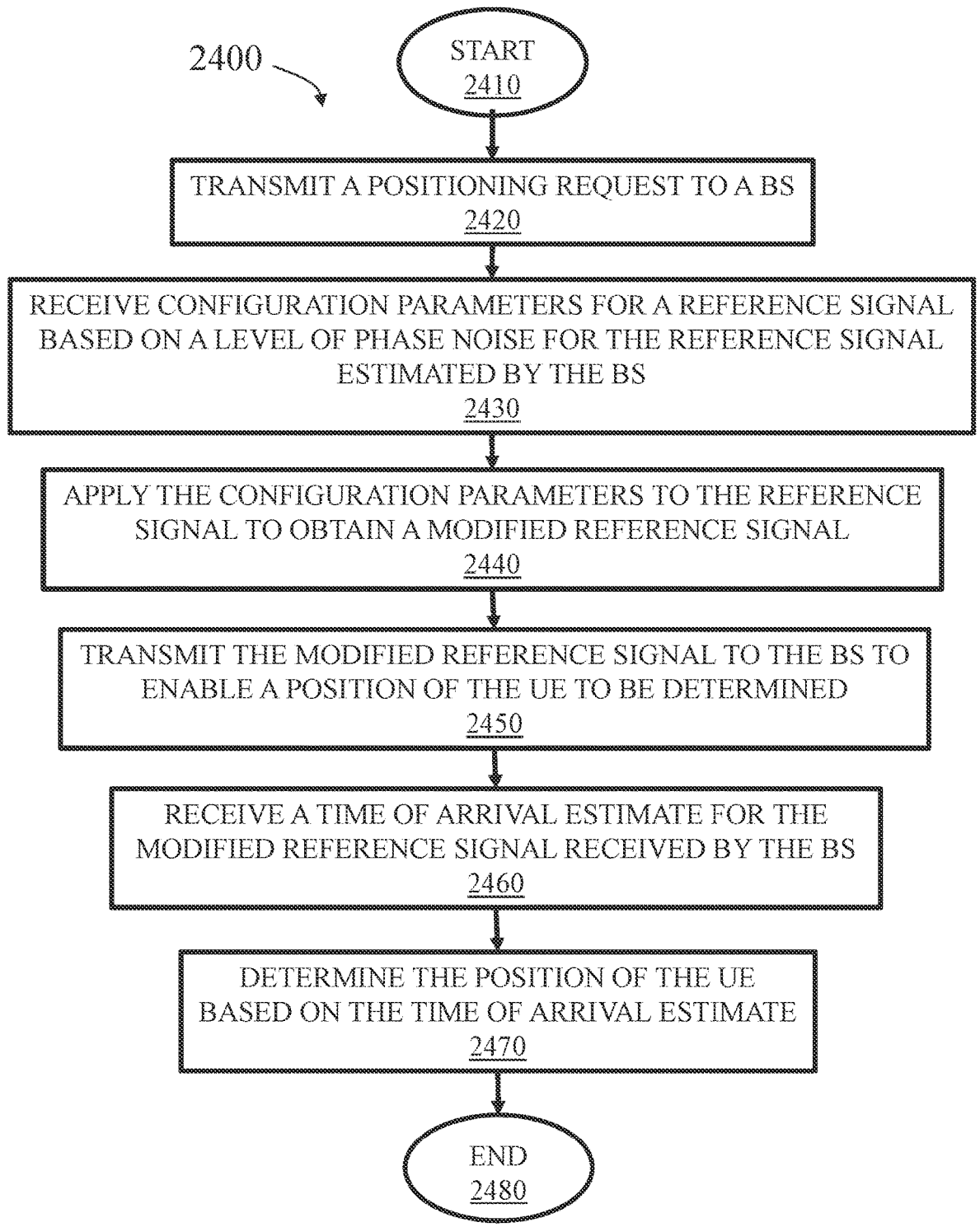

Turning now to FIG. 24, illustrated is a flow diagram of an embodiment of a method 2400 of operating a communication system. The method 2400 may be employable to determine a position of a communication node such as a user equipment (or any type of wireless device, e.g., a transmitting node) in a communication system based on, for instance, a time of arrival estimate of a reference signal. The method 2400 is operable on a communication node such as a user equipment in the communication system (e.g., a 5G communication system). The method 2400 begins at a start step or module 2410. At a step or module 2420, a positioning request is transmitted to a base station ("BS", e.g., a receiving node). At a step or module 2430, configuration parameters for a reference signal are received (e.g., from a location server) based on a level of phase noise for the reference signal estimated by the base station. In an embodiment, the configuration parameters for the reference signal may include at least one of subcarrier spacing of the reference signal, power allocation on subcarriers of the reference signal, and a total number of subcarriers of the reference signal.

At a step or module 2440, the configuration parameters are applied to the reference signal to obtain a modified reference signal. At a step or module 2450, the modified reference signal is transmitted to the base station to enable a position of the user equipment ("UE") to be determined. At a step or module 2460, a time of arrival estimate is received for the modified reference signal received by the base station. At a step or module 2470, the position of the user equipment is determined based, at least in part, on the time of arrival estimate. The method 2400 ends at a step or module 2480.

In an embodiment, the system and method are operable in a communication node wherein a reference signal is transmitted between a user equipment (or other wireless device) and an access node such as a base station. The communication node that receives the reference signal estimates a level of phase noise for the reference signal. Configuration parameters for the reference signal based on the estimate of the level of phase noise are employed by the communication node that transmits the reference signal to reconfigure the reference signal design (to obtain a modified reference signal). The configuration parameters include any parameter that affects a reference signal, based on a level of phase noise, such as, without limitation, subcarrier spacing, power allocation on subcarriers, total number of subcarriers, an OFDM cyclic prefix ("CP") length, modulation type and symbol duration.

For example, a configuration parameter for a reference signal sent from a transmitting node to a receiving node may be a power allocation on subcarriers of the reference signal. If the estimate of the level of phase noise for the reference signal indicates a high level of phase noise (such as above a threshold), then the power allocation on subcarriers of the reference signal should be increased to obtain a modified reference signal. In other words, the configuration parameter (in this case power allocation) is determined based on the estimate of the level of phase noise and applied to the reference signal to obtain the modified reference signal. As a result, the level of phase noise at the receiving node for the modified reference signal is reduced. Of course, other configuration parameters such as subcarrier spacing and the total number of subcarriers for the reference signal can be evaluated and adjusted to obtain the modified reference signal.

Additionally, an estimated time of arrival of the modified reference signal is used to more accurately determine a position of either the transmitting node or receiving node (e.g., a distance therebetween). In other words, since the modified reference signal has a lower level of phase noise, the estimated time of arrival therefor is more accurate and the determination of the position of the respective node is also more accurate.

In one embodiment including representative reference numbers from ones of the aforementioned described FIGUREs, an apparatus (e.g., a location server 130, 710, 950 and related method 1900 of operating the same) in a communication system (100, 700, 900, e.g. a 5G communication system) includes processing circuitry (305, 718) to (1) receive (1920) a positioning request for a user equipment (105, 730, 1030), (2) receive (1930) an estimate of a level of phase noise for a reference signal (1020) from the user equipment (105, 730, 1030) via, for instance, the base station (110, 720, 1010), (3) determine (1940) configuration parameters for the reference signal (1020) based on the estimate of the level of phase noise, and (4) transmit (1950) the configuration parameters to a base station (110, 720, 1010) to enable the base station (110, 720, 1010) to apply the configuration parameters to the reference signal (1020) to obtain a modified reference signal (1020) and to enable a position of the user equipment (105, 730, 1030) to be determined. The processing circuitry (305, 718) is also configured to receive (1960) a time of arrival estimate for the modified reference signal (1020) received by the user equipment (105, 730, 1030), and determine (1970) the position of the user equipment (105, 730, 1030) based on the time of arrival estimate. The configuration parameters for the reference signal (1020) may include at least one of subcarrier spacing of the reference signal (1020), power allocation on subcarriers of the reference signal (1020), and a total number of subcarriers of the reference signal (1020).

In an embodiment including representative reference numbers from ones of the aforementioned described FIGUREs, an apparatus (e.g., a base station 110, 720, 1010 and related method 2000 of operating the same) in a communication system (100, 700, 900, e.g. a 5G communication system) includes processing circuitry (305, 728) configured to (1) receive (2020) configuration parameters (e.g., from a location server 130, 710, 950) for a reference signal (1020) based on a level of phase noise for the reference signal (1020) estimated by a user equipment, (2) apply (2030) the configuration parameters to the reference signal (1020) to obtain a modified reference signal (1020), and (3) transmit (2040) the modified reference signal (1020) to the user equipment (105, 730, 1030) to enable a position of the user equipment (105, 730, 1030) to be determined. The processing circuitry (305, 728) is also configured to receive (2050) a time of arrival estimate for the modified reference signal (1020) received by the user equipment (105, 730, 1030), and determine (2060) the position of the user equipment (105, 730, 1030) based on the time of arrival estimate. The configuration parameters for the reference signal (1020) may include at least one of subcarrier spacing of the reference signal (1020), power allocation on subcarriers of the reference signal (1020), and a total number of subcarriers of the reference signal (1020).

In an embodiment including representative reference numbers from ones of the aforementioned described FIGUREs, an apparatus (e.g., a user equipment 105, 730, 1030 and related method 2100 of operating the same) in a communication system (100, 700, 900, e.g. a 5G communication system) includes processing circuitry (205, 738) configured to (1) transmit (2120) a positioning request to a base station (110, 720, 1010), (2) estimate (2130) a level of phase noise for a reference signal (1020), (3) transmit (2140) the estimate of the level of phase noise to enable the base station (110, 720, 1010) to apply configuration parameters (e.g., from a location server 130, 710, 950) to the reference signal (1020) to obtain a modified reference signal (1020), the configuration parameters being based on the estimate of the level of phase noise, and (4) receive (2150) the modified reference signal (1020) from the base station (110, 720, 1010) to enable a position of the apparatus (105, 730, 1030) to be determined. The processing circuitry (205, 738) is also configured to determine (2160) a time of arrival estimate for the modified reference signal (1020) received by the apparatus (105, 730, 1030), and determine (2170) the position of the apparatus (105, 730, 1030) based on the time of arrival estimate. The configuration parameters for the reference signal (1020) may include at least one of subcarrier spacing of the reference signal (1020), power allocation on subcarriers of the reference signal (1020), and a total number of subcarriers of the reference signal (1020).

In an embodiment including representative reference numbers from ones of the aforementioned described FIGUREs, an apparatus (e.g., a location server 130, 710, 950 and related method 2200 of operating the same) in a communication system (100, 700, 900, e.g., a 5G communication system) includes processing circuitry (305, 718) configured to (1) receive (2220) a positioning request for a user equipment (105, 730, 1040), (2) receive (2230) an estimate of a level of phase noise for a reference signal (1050) from a base station serving the user equipment (105, 730, 1040), (3) determine (2240) configuration parameters for the reference signal (1050) based on the estimate of the level of phase noise, and (4) transmit (2250) the configuration parameters to the user equipment (105, 730, 1040) via, for instance, the base station (110, 720, 1060) to enable the user equipment (105, 730, 1040) to apply the configuration parameters to the reference signal (1050) to obtain a modified reference signal (1050) and to enable a position of the user equipment (105, 730, 1040) to be determined. The processing circuitry (305, 718) is also configured to receive (2260) a time of arrival estimate for the modified reference signal (1050) received by the base station (110, 720, 1060), and determine (2270) the position of the user equipment (105, 730, 1040) based on the time of arrival estimate. The configuration parameters for the reference signal (1050) may include at least one of subcarrier spacing of the reference signal (1050), power allocation on subcarriers of the reference signal (1050), and a total number of subcarriers of the reference signal (1050).

In an embodiment including representative reference numbers from ones of the aforementioned described FIGUREs, an apparatus (e.g., a base station 110, 720, 1060 and related method 2300 of operating the same) in a communication system (100, 700, 900, e.g., a 5G communication system) includes processing circuitry (305, 728) configured to (1) receive (2320) configuration parameters (e.g., from a location server 130, 710, 950) for a reference signal (1050) based on a level of phase noise for the reference signal (1050) estimated by the apparatus (110, 720, 1060), (2) transmit (2330) the configuration parameters to the user equipment (105, 730, 1040) to enable the user equipment (105, 730, 1040) to apply the configuration parameters to the reference signal (1050) to obtain a modified reference signal (1050), and (3) receive (2340) the modified reference signal (1050) from the user equipment (105, 730, 1040) to enable a position of the user equipment (105, 730, 1040) to be determined. The processing circuitry (305, 728) is also configured to determine (2350) a time of arrival estimate for the modified reference signal (1050) received by the apparatus (110, 720, 1060), and determine (2360) the position of the user equipment (105, 730, 1040) based on the time of arrival estimate.

The configuration parameters for the reference signal (1050) may include at least one of subcarrier spacing of the reference signal (1050), power allocation on subcarriers of the reference signal (1050), and a total number of subcarriers of the reference signal (1050).

In an embodiment including representative reference numbers from ones of the aforementioned described FIGUREs, an apparatus (e.g., a user equipment 105, 730, 1040 and related method 2400 of operating the same) in a communication system (100, 700, 900, e.g., a 5G communication system) includes processing circuitry (205, 738) configured to (1) transmit (2420) a positioning request to a base station (110, 720, 1060), (2) receive (2430) configuration parameters (e.g., from a location server 130, 710, 950) for a reference signal (1050) based on a level of phase noise for the reference signal (1050) estimated by the base station (110, 720, 1060), (3) apply (2440) the configuration parameters to the reference signal (1050) to obtain a modified reference signal (1050), and (4) transmit (2450) the modified reference signal (1050) to the base station to enable a position of the apparatus (105, 730, 1040) to be determined. The processing circuitry (205, 738) is also configured to receive (2460) a time of arrival estimate for the modified reference signal (1050) received by the base station (110, 720, 1060), and determine (2470) the position of the apparatus (105, 730, 1040) based on the time of arrival estimate. The configuration parameters for the reference signal (1050) may include at least one of subcarrier spacing of the reference signal (1050), power allocation on subcarriers of the reference signal (1050), and a total number of subcarriers of the reference signal (1050).

While reference has been made to base station, user equipment and location server herein, any radio access node (or access node in general), wireless device and computer system, respectively, is well within the broad scope of the present disclosure.

In an embodiment including representative reference numbers from ones of the aforementioned described FIGUREs, an apparatus (e.g., a location server 130, 710, 950 and related method of operating the same) in a communication system (100, 700, 900, e.g., a 5G communication system) includes processing circuitry (305, 718) configured to (1) receive a positioning request for one of a transmitting node and a receiving node, (2) receive an estimate of a level of phase noise for a reference signal from the receiving node, (3) determine configuration parameters for the reference signal based on the estimate of the level of phase noise, and (4) transmit the configuration parameters to the transmitting node to enable the transmitting node to apply the configuration parameters to the reference signal to obtain a modified reference signal and to enable a position of one of the transmitting node and the receiving node to be determined. The processing circuitry (305, 718) is also configured to receive a time of arrival estimate for the modified reference signal received by the receiving node, and determine the position of one of the transmitting node and the receiving node based on the time of arrival estimate. The configuration parameters for the reference signal may include at least one of subcarrier spacing of the reference signal, power allocation on subcarriers of the reference signal, and a total number of subcarriers of the reference signal. The transmitting node with respect to the reference signal or modified reference signal (1020) may be a base station (110, 720, 1010) and the receiving node a user equipment (105, 730, 1030) as illustrated, for instance, in FIGS. 1, 7, 10A, 11, 13 and 19-21. Furthermore, the transmitting node with respect to the reference signal or modified reference signal (1050) may be a user equipment (105, 730, 1040) and the receiving node a base station (110, 720, 1060) as illustrated, for instance, in FIGS. 1, 7, 10B, 12, 14 and 22-24. The transmitting node and the receiving node may also be referred to a first node and/or a second node.

In an embodiment including representative reference numbers from ones of the aforementioned described FIGUREs, a transmitting node operable with a location server (130, 710, 950) in a communication system (100, 700, 900, e.g., a 5G communication system) includes processing circuitry configured to (1) receive configuration parameters from, for instance, the location server (130, 710, 950) for a reference signal based on a level of phase noise for the reference signal estimated by a receiving node, (2) apply the configuration parameters to the reference signal to obtain a modified reference signal, and (3) transmit the modified reference signal to the receiving node to enable a position of one of the transmitting node and the receiving node to be determined. The processing circuitry is also configured to receive a time of arrival estimate for the modified reference signal received by the receiving node, and determine the position of one of the transmitting node and the receiving node based on the time of arrival estimate. The configuration parameters for the reference signal may include at least one of subcarrier spacing of the reference signal, power allocation on subcarriers of the reference signal, and a total number of subcarriers of the reference signal. The transmitting node with respect to the reference signal or modified reference signal (1020) may be a base station (110, 720, 1010) and the receiving node a user equipment (105, 730, 1030) as illustrated, for instance, in FIGS. 1, 7, 10A, 11, 13 and 19-21. Furthermore, the transmitting node with respect to the reference signal or modified reference signal (1050) may be a user equipment (105, 730, 1040) and the receiving node a base station (110, 720, 1060) as illustrated, for instance, in FIGS. 1, 7, 10B, 12, 14 and 22-24. The transmitting node and the receiving node may also be referred to a first node and/or a second node.

In an embodiment including representative reference numbers from ones of the aforementioned described FIGUREs, a receiving node operable with a location server (130, 710, 950) in a communication system (100, 700, 900, e.g., a 5G communication system) includes processing circuitry (1) estimate a level of phase noise for a reference signal, (2) transmit the estimate of the level of phase noise to enable a transmitting node to apply configuration parameters to the reference signal to obtain a modified reference signal (the configuration parameters being based on the estimate of the level of phase noise), and (3) receive the modified reference signal from the transmitting node to enable a position of one of the receiving node and the transmitting node to be determined. The processing circuitry is also configured to determine a time of arrival estimate for the modified reference signal received by the receiving node, and determine the position of one of the transmitting node and the receiving node based on the time of arrival estimate. The configuration parameters for the reference signal may include at least one of subcarrier spacing of the reference signal, power allocation on subcarriers of the reference signal, and a total number of subcarriers of the reference signal. The transmitting node with respect to the reference signal or modified reference signal (1020) may be a base station (110, 720, 1010) and the receiving node a user equipment (105, 730, 1030) as illustrated, for instance, in FIGS. 1, 7, 10A, 11, 13 and 19-21. Furthermore, the transmitting node with respect to the reference signal or modified reference signal (1050) may be a user equipment (105, 730, 1040) and the receiving node a base station (110, 720, 1060) as illustrated, for instance, in FIGS. 1, 7, 10B, 12, 14 and 22-24. The transmitting node and the receiving node may also be referred to a first node and/or a second node.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed:

1. An apparatus in a communication system, comprising: processing circuitry, configured to:
   receive configuration parameters for a reference signal based on a level of phase noise for the reference signal estimated by a user equipment, the configuration parameters for the reference signal comprising a subcarrier spacing of the reference signal;
   apply the configuration parameters to the reference signal to obtain a modified reference signal; and
   transmit the modified reference signal to the user equipment to enable a position of the user equipment to be determined.

2. The apparatus as recited in claim 1, wherein the processing circuitry is configured to:
   receive a time of arrival estimate for the modified reference signal received by the user equipment; and
   determine the position of the user equipment based on the time of arrival estimate.

3. A method of operating an apparatus in a communication system, the method comprising:
   receiving configuration parameters for a reference signal based on a level of phase noise for the reference signal estimated by a user equipment, the configuration parameters for the reference signal comprising a subcarrier spacing of the reference signal;
   applying the configuration parameters to the reference signal to obtain a modified reference signal; and
   transmitting the modified reference signal to the user equipment to enable a position of the user equipment to be determined.

4. The method as recited in claim 3, further comprising:
   receiving a time of arrival estimate for the modified reference signal received by the user equipment; and
   determining the position of said user equipment based on the time of arrival estimate.

5. An apparatus in a communication system, the apparatus comprising:
   processing circuitry, configured to:
   transmit a positioning request to a base station;
   estimate a level of phase noise for a reference signal;
   transmit said estimate of the level of phase noise to enable the base station to apply configuration parameters to the reference signal to obtain a modified reference signal, the configuration parameters being based on the estimate of the level of phase noise and the configuration parameters for the reference signal comprising a subcarrier spacing of the reference signal; and
   receive the modified reference signal from the base station to enable a position of the apparatus to be determined.

6. The apparatus as recited in claim 5, wherein the processing circuitry is configured to:
   determine a time of arrival estimate for the modified reference signal received by said apparatus; and
   determine the position of the apparatus based on the time of arrival estimate.

7. A method of operating an apparatus in a communication system, the method comprising:
   transmitting a positioning request to a base station;
   estimating a level of phase noise for a reference signal;
   transmitting the estimate of the level of phase noise to enable the base station to apply configuration parameters to the reference signal to obtain a modified reference signal, the configuration parameters being based on the estimate of said level of phase noise and the configuration parameters for the reference signal comprising a subcarrier spacing of the reference signal; and
   receiving the modified reference signal from the base station to enable a position of the apparatus to be determined.

8. The method as recited in claim 7, further comprising:
   determining a time of arrival estimate for the modified reference signal received by the apparatus; and
   determining the position of said apparatus based on the time of arrival estimate.

* * * * *